US008108386B2

(12) United States Patent  
Stuart et al.

(10) Patent No.: US 8,108,386 B2  
(45) Date of Patent: Jan. 31, 2012

(54) MORE EFFICIENT SEARCH ALGORITHM (MESA) USING ALPHA OMEGA SEARCH STRATEGY

(76) Inventors: Robert O. Stuart, Indianapolis, IN (US); Scott P. Stuart, Fort Bragg, CA (US)

( * ) Notice: Subject to any disclaimer, the term of this patent is extended or adjusted under 35 U.S.C. 154(b) by 1209 days.

(21) Appl. No.: 11/221,171

(22) Filed: Sep. 7, 2005

(65) Prior Publication Data

US 2006/0053101 A1   Mar. 9, 2006

Related U.S. Application Data

(60) Provisional application No. 60/607,680, filed on Sep. 7, 2004, provisional application No. 60/618,755, filed on Oct. 14, 2004, provisional application No. 60/684,728, filed on May 26, 2005.

(51) Int. Cl.  
*G06F 17/30* (2006.01)  
*G06F 7/00* (2006.01)

(52) U.S. Cl. ........................................ 707/728; 707/759

(58) Field of Classification Search ................ 707/1–10, 707/100–104, 728, 759  
See application file for complete search history.

(56) References Cited

U.S. PATENT DOCUMENTS

| | | | |
|---|---|---|---|
| 4,276,597 A | 6/1981 | Dissly et al. | |
| 5,303,150 A * | 4/1994 | Kameda | 704/9 |
| 5,379,420 A | 1/1995 | Ullner | |
| 5,404,507 A | 4/1995 | Bohm et al. | |
| 5,675,324 A | 10/1997 | Hashimoto et al. | |
| 5,926,652 A * | 7/1999 | Reznak | 712/300 |
| 6,199,062 B1 * | 3/2001 | Byrne et al. | 707/3 |
| 6,243,684 B1 * | 6/2001 | Stuart et al. | 704/275 |
| 6,304,844 B1 | 10/2001 | Pan et al. | |
| 6,321,224 B1 | 11/2001 | Beall et al. | |
| 6,424,963 B1 | 7/2002 | Ito et al. | |
| 6,598,039 B1 | 7/2003 | Livowsky | |
| 6,625,595 B1 | 9/2003 | Anderson et al. | |
| 6,643,622 B2 | 11/2003 | Stuart et al. | |
| 6,662,180 B1 | 12/2003 | Aref et al. | |
| 6,704,708 B1 | 3/2004 | Pikering | |
| 6,735,583 B1 | 5/2004 | Bjamestam et al. | |
| 6,785,677 B1 * | 8/2004 | Fritchman | 707/6 |
| 6,792,096 B2 | 9/2004 | Martin et al. | |
| 6,798,867 B1 | 9/2004 | Zimgibl et al. | |
| 6,862,713 B1 | 3/2005 | Kraft et al. | |
| 7,093,693 B1 * | 8/2006 | Gazdzinski | 187/384 |
| 2005/0027702 A1 * | 2/2005 | Jensen et al. | 707/3 |
| 2005/0084152 A1 * | 4/2005 | McPeake et al. | 382/173 |

* cited by examiner

*Primary Examiner* — Hosain Alam  
*Assistant Examiner* — Navneet K Ahluwalia

(57) ABSTRACT

A more efficient search algorithm introduces a variety of new tools and strategies to more efficiently search and retrieve desired records from an electronic database. Among these are a strategy that utilizes the first and last positional characters, or phonemes, to exploit the fact that often last positional character is nearly as important as a first positional character in distinguishing database records from one another. In addition, virtual search parameters, that are not a portion of the database records, can also be utilized in distinguishing database records, such as by identifying a number of characters in a search field for a requested database record as a way of distinguishing that record from all others with a different number of characters. The invention finds potential application in any database search application, but is particularly useful in delivering directory assistance services.

22 Claims, 7 Drawing Sheets

FIG. 1    General Computer System

Application Server utilizing AOSM and MESS

FIG. 3   Alpha-Omega Search Module

More Efficient Search Sequence Module

Flowchart of Alpha-Omega Search
Method utilizing the More Efficient
Search Sequence Flowchart of search methodology utilizing Virtual Search Parameters

MORE EFFICIENT SEARCH ALGORITHM (MESA) USING ALPHA OMEGA SEARCH STRATEGY

RELATION TO OTHER PATENT APPLICATIONS

This application claims the benefit of provisional application No. 60/607,680, filed Sep. 7, 2004, entitled more efficient search algorithm (MESA); and provisional application 60/618,755, filed Oct. 14, 2004 with the same title; and provisional application 60/684,728, filed May 26, 2005, again with the same title.

TECHNICAL FIELD

This invention relates generally to systems and methods for selectively identifying, retrieving and manipulating electronically stored information, and more specifically, to systems and methods for selectively identifying, retrieving and manipulating desired or requested information from a directory assistance search environment.

BACKGROUND ART

Data Retrieval, Generally

Current data retrieval methods rely on identifying and retrieving one or more data records from an informational database by executing some form of sequence-based, alphanumeric search query for one or more particular data fields. In order to effectively identify a desired record, a sufficient number of forward-sequential, alphanumeric characters must be entered into a search query to perform an exact match and corresponding proper identification and retrieval of a desired data record. Typically, an exact match of an entire whole alphanumeric word or data field is required to ensure one hundred percent confidence that the retrieved record is, in fact, the desired record. An example of a successful, whole-word, forward-sequential search query would require a user to enter "JOHN" in a first name field and "SMITH" in a last name field to find the database record for JOHN SMITH in a database containing names.

Current art has improved somewhat upon the need for an exact, whole-word or field match by allowing data retrieval systems to retrieve records with only a partial, forward-sequential, alphanumeric match of one or more data fields. Using the JOHN SMITH example above, a user may type in one or more forward-sequential letters of the first name, such as "JO" and one or more forward-sequential letters of the last name, such as "SM" into a search query. As with the whole-word match query, all JOHN SMITH data records are retrieved. One particular advantage of this type of partial, forward-sequential query is to minimize the number of keystrokes a user may be required to enter when retrieving data records. A significant disadvantage of this type of partial, forward-sequential query is that all data records that begin with "JO" in the first name field and begin with "SM" in the last name field are retrieved. The data record for JOSEPH SMALL is just as likely to be retrieved as the record for JOHN SMITH. The confidence of correct record identification and retrieval can only be increased as more and more forward-sequential characters are added to the appropriate search fields. In addition to methods for formulating and executing a single search query, prior art also teaches methods and systems for sequencing or ordering multiple search queries. Current art teaches that the middle, or intervening characters between the first and last positional characters are integral to both an exact, whole-word matching process and to an increasing confidence of an exact, forward-sequential, partial-word matching process.

Directory Assistance

Today's Directory Assistance (DA) retrieval systems and architecture also follow a strict, forward-sequential, partial-word matching process in which only the first three characters of a search term are used to retrieve all listing that match these first three characters. This basic trigram format is relatively inefficient in that it retrieves numerous listings which have a great likelihood of having the same, or very similar, spellings. A directory assistance agent may spend considerable time and resources paging through screens of retrieved, matching records in an attempt to identify the correct requested listing. Additionally, current DA database architecture is well-defined and usually contains three fixed search fields, each with a fixed length of 12 characters. Separate databases are also used for business, Most Frequently Requested ('MFR'), Residence and Federal, State and local governments. Today's basic architecture has remained essentially the same since the mid-1970s. As then, the theory and intuitive and seemingly most efficient approach was that the first character of the primary name search field was the most important search character, with the additions of the second and third sequence-based search characters being incrementally relevant in a diminishing manner. Additional characters after the initial three characters were considered completely ineffective for common trigrams like INDiana and INDianapolis.

The recent use of automatic voice recognition ('AVR') technology has achieved a limited increase in efficiency and productivity. However, speaker independent systems and the requirement to correctly interpret or translate the request from over 200 million customers and then search and retrieve the one exact match out of 200 million directory listings is extraordinarily difficult. The result is a very low percentage of calls 'contained' within the AVR system and a correspondingly high substitution or error rate. Successful AVR calls are typically limited to high volume, MFR business directory requests with virtually no residential requests being completed with speaker independent AVR technology.

Despite the incremental improvements in productivity made by AVR technology, a number of problems still exist. These problems fall under several broad categories. For example, powerful search characters within the search parameters have not been included in the search algorithms; agent workstation consoles have not been integrated with database architecture, search parameters or search algorithms; unique database characteristics and structure have not been recognized; the root problems have not been clearly identified, AVR capability has not been fully integrated into the total process, and the agents Subject Matter Expertise ('SME') of the database has not been utilized.

The present invention is directed to improving these and other aspects of informational database record identification and retrieval methods and systems.

DISCLOSURE OF THE INVENTION

In a first preferred embodiment of the invention, a novel database search query method and system that utilizes only the first and last positional characters of one or more search fields is executed upon one or more informational databases. At a minimum, each informational database contains at least one data field that is capable of being queried on the first and last positional characters of data records contained within that data field. Additionally, each database may contain at least one data field that is capable of being queried on any one or more additional key characters positioned anywhere between the first and last positional characters of data records contained within that data field. Database queries may be executed via a keyed-input method and system as well as a voiced-input method and system utilizing current AVR technology.

In a preferred aspect of this embodiment, the invention is additionally capable of determining, for each informational database, the statistical frequency distribution (frequency of occurrence (%)) of each and every unique first and last positional character combination for every data record within one or more searchable data fields. This frequency of occurrence information may be determined in a predetermined or dynamic manner. The frequency of occurrence information is further utilized to hierarchically arrange and execute multiple search queries in order of a most-restrictive to a least-restrictive query. Moreover, the invention is capable of determining and utilizing the statistical frequency distribution information for all records within a database as well as for any subset of records, including those records retrieved by a prior search.

In another preferred aspect, the invention is capable of determining and utilizing Virtual Search Parameters ('VSPs') in search queries executed upon one or more informational databases. A VSP is a search parameter that is derived from an objective or subjective attribute of records contained within one or more data fields. The primary objects of a VSP include: more efficiently eliminating similar, but incorrect data records; and more efficiently increasing the probability of identifying a correct listing.

VSPs may be based on either an objective or subjective attribute of records within a single or plurality of data fields. Objective attributes include those attributes that are quantifiable or physical and are considered 'universally accepted' facts. As such, objective VSPs are generally 'true' for each user of the system. Subjective attributes are those attributes that are generally qualitative in nature and may be based on any personal or non-objective attribute or characteristic. As such, subjective attributes are not necessarily 'true', or the same, for each user of the system.

VSPs may be derived from objective or subjective attributes of a single record or a group of records, contained within a single data field or a group of data fields, belonging to a single informational database or multiple, related databases. Examples of an objective VSP include statistically-based characteristics of a particular informational database, such as the actual frequency of occurrence for a particular first and last positional character combination. A corresponding subjective VSP includes categorizations based on the actual frequency of occurrence, such as common and uncommon.

In another preferred aspect, a novel method and system for retrieving records from an informational database utilizing current AVR technology is taught. The method consists of initially receiving vocalized input of both the first and last positional characters for one or more search fields. The vocalized input may consist of either the first and last positional characters, where each desired character is voiced individually, or the first and last positional phonemes, where each phoneme is voiced individually. Alternatively, the desired first and last positional characters or phonemes of a particular search field may be isolated from the vocalized input of an entire search term. Under either approach, i.e. whether the first and last positional characters or phonemes are input individually through voiced utterances, or whether the first and last positional characters or phonemes are isolated from whole-word search terms input through voiced utterances, the method utilizes these first and last positional characters or phonemes to execute a database search. This database search may be executed in one of several alternative methods. Each method relies on a novel application of current AVR technology.

A first preferred method of executing a voiced-input search includes speech-to-text translation of the voiced input, including speech-to-text translation of characters or speech-to-text translation of phonemes. As is taught in current art, every phoneme may be represented by some combination of alphabetic letters. Under the speech-to-text translation method utilizing characters, and not phonemes, the search query is executed upon the database in the same manner as a keyed-input search query. Under the speech-to-text translation method utilizing phonemes, the database must be structured or formatted in such a way as to allow for searching on the alphabetic text equivalents of the first and last positional phonemes. Specifically, the database may contain the alphabetic text equivalents for at least the first and last positional phonemes for each data record contained within one or more searchable data fields. These alphabetic text equivalents for the first and last positional phonemes may be located, and accessed and may be predetermined or dynamic. If dynamic, then the alphabetic text equivalents for the relevant phonemes may be derived or calculated using any method of programming available, as is practiced today in the relevant art.

A second preferred method of executing a voiced input search utilizes current voiceprint or phoneme audiogram recognition and matching technology to first interpret the voiced first and last positional phonemes. Once interpreted, the method next retrieves those database records where the audiograms or voiceprints of the interpreted first and last positional phonemes of the search query match the audiograms or voiceprints of the first and last positional phonemes of the particular data records.

In a second preferred embodiment of the invention, the novel search system and method of the first preferred embodiment is performed within a directory assistance call center environment, preferably utilizing a live call handling agent and both speaker-independent and speaker-dependent AVR technology.

In one preferred aspect of this second preferred embodiment, a live call handling agent utilizes a personal phoneme database to more efficiently and more effectively formulate and execute search queries in accordance with the system and method of the first preferred embodiment.

In a second preferred aspect of this second preferred embodiment, a composite progressive confidence score that is calculated from a plurality of sources, including all components of the AVR method and system as well as from all components of the novel search system and method. In particular the statistical characteristics inherent to a particular database, are utilized to more effectively and more efficiently to formulate and execute search queries in accordance with the first preferred embodiment of the invention.

In a third preferred aspect of this second preferred embodiment, a system and method that utilizes an integrated system optimizer and an intelligent query system to dynamically assist a call handling agent or automated attendant is utilized to formulate and execute more effective and more efficient search strategies in accordance with the first preferred embodiment of this invention.

In a fourth preferred aspect of this embodiment, agent operand commands are utilized to direct a specific computer program instruction or step. These agent operand commands are composed of an action, a linking, and an object word. The combination of action, linking and object command words allows for the possibility of formulating multiple database search queries. Action words include "search", "expand", "delete." Linking words include Boolean operators, specifically including "And", "or", "all", "except", "only", "not." Object words include an element of a database record field, including any positional element of the field; object includes virtual search parameters, including the virtual search parameter categorizations of 'common' and 'uncommon.'

In a fifth preferred aspect of this invention, an integrated agent workstation is utilized to more effectively and efficiently formulate and execute search queries using the Alpha-Omega search methodology of the first preferred embodiment. The understanding of the insights into the Alpha-Omega search method and unique database characteristics lead to the fundamental need for an integration of the agent's work tool, the agent's workstation, with database architecture, search algorithms, search parameters and AVR technology.

It is one object of the present invention to provide a system and method for selectively identifying and retrieving data records from an informational database that does not rely on correct spelling or whole-word matching.

It is another object of the present invention to provide a system and method for selectively identifying and retrieving data records from an informational database that utilizes only the first and last positional characters or phonemes of one or more search fields.

It is yet another object of the present invention to provide a system and method for selectively identifying and retrieving data records from an informational database that utilizes the statistical characteristics inherent to a particular database or any subset of the database to selectively identify, retrieve, or manipulate data records or data record search queries.

It is still another object of the present invention to provide a system and method for utilizing virtual search parameters that are derived from an objective or subjective attribute of a data records or data fields contained within one or more particular databases, where these virtual search parameters more effectively and more efficiently increase the probability of identifying, retrieving and manipulating desired data records.

It is another object of the present invention to provide a system and method for utilizing both speaker-independent and speaker-dependent voice recognition technology in conjunction with the novel search system and method to more effectively and more efficiently selectively identify, retrieve and manipulate desired data records.

It is yet another object of the present invention to provide a system and method for utilizing a progressive composite confidence score that is calculated from a plurality of sources, including all components of the AVR method and system as well as from all components of the novel search system and method, in particular the statistical characteristics inherent to a particular database.

It is yet another object of the present invention to provide a system and method for utilizing an integrated system optimizer (ISO) and an intelligent query system (IQS) to dynamically assist a call handling agent or automated attendant formulate and execute more effective and more efficient search strategies.

It is yet another object of the present invention to utilize agent operand commands and an integrated agent workstation in order to more effectively and efficiently formulate and execute search methodologies.

DETAILED DISCLOSURE

The present invention improves upon current data retrieval systems and methods in a number of novel ways. Specifically, the present invention relies upon the following improvements, among others: a search methodology that does not rely on exact, whole-word matching; a search methodology that does not rely on sequential, forward-fill matching; a search methodology that does not rely on trigram or other sequence-based letter combinations matching; a search methodology that does not rely on intervening characters between the first and last positional characters of any search term; a search methodology that does not rely on correct spelling; a search methodology that uses only the first and last positional characters or phonemes of one or more particular search terms to uniquely identify and retrieve records; and finally, a search methodology that does rely on the statistical characteristics inherent to a particular database to more efficiently identify and retrieve records.

In a first preferred embodiment of the invention, a system and method is taught for generalized data retrieval from an informational database. The system and method executes a novel database search query that utilizes only and both the first and last positional characters of one or more search fields upon one or more informational databases.

Figure 1:
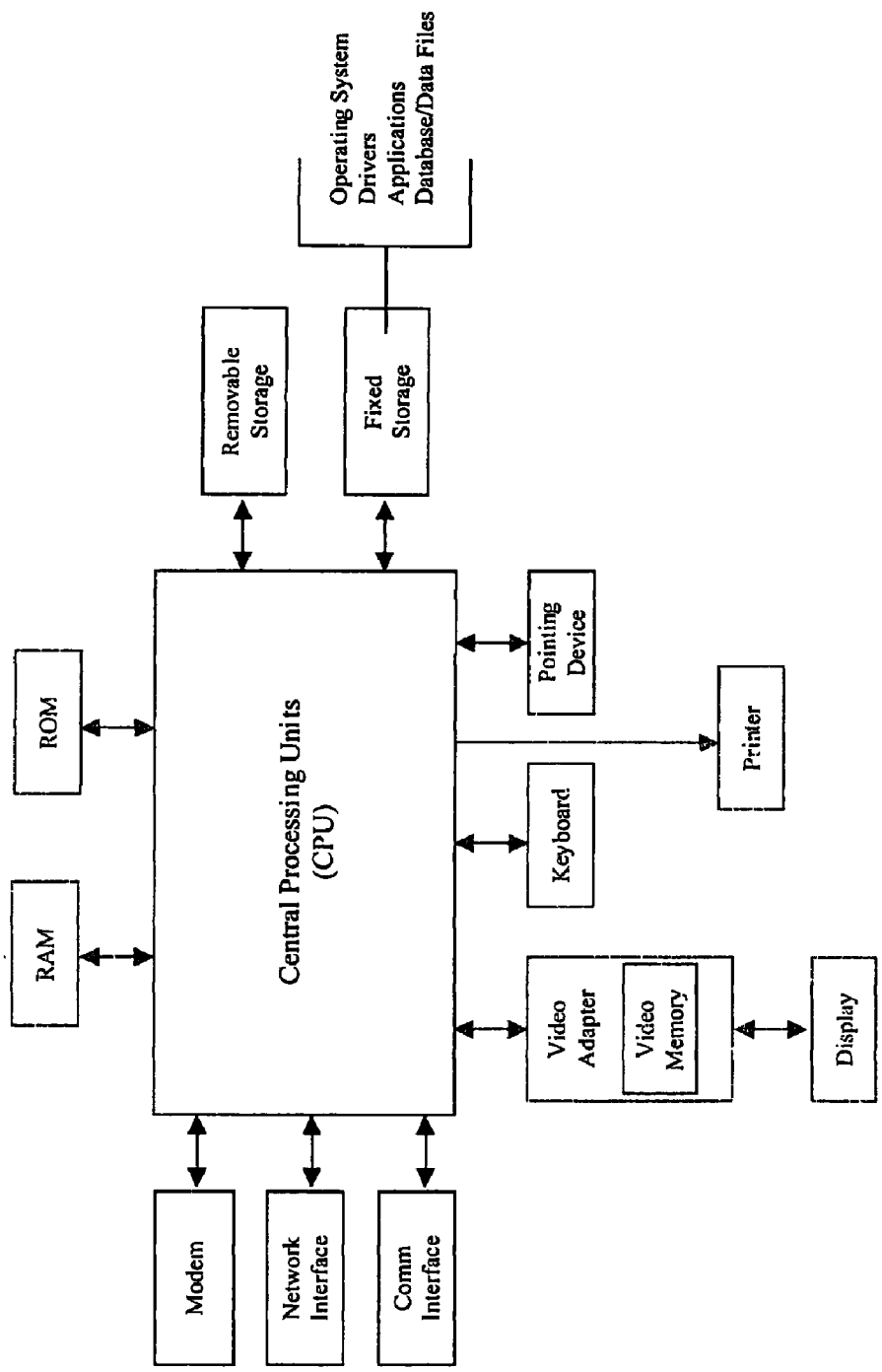
FIG. 1 is a diagram of a representational standard computer system capable of employing the principles of the invention.

As illustrated in FIG. 1, there is shown a diagram of a representational standard computer system capable of employing the principles of the invention. This computer system may be any type of computer system capable of storing and retrieving records from an informational database. Generally, the computer-based database retrieval system should include a computer, with a central processing unit; a memory device; a storage device; and a display screen/console.

Additionally, the system utilizes preferably a user of the computer system, where the user functions as the requestor of a desired record, where such requester may be a live or automated or computer-based requestor, an informational database containing any type of searchable or indexable data records, and a means for executing one or more database search queries. The system includes any type of input means, including: a keyed-input means; a voiced-utterance means, either speaker-independent or speaker dependent; a computer-generated or automated (programmed) means requiring no contemporaneous human input; or any other input means by which a search query could be executed upon the database. Preferably the system includes a workstation with a keyboard, a display monitor, and an interactive voice recognition unit. The system may also include some type of telephonic communications device for accessing and searching databases that are not directly linked to the requestor's workstation.

Figure 2:
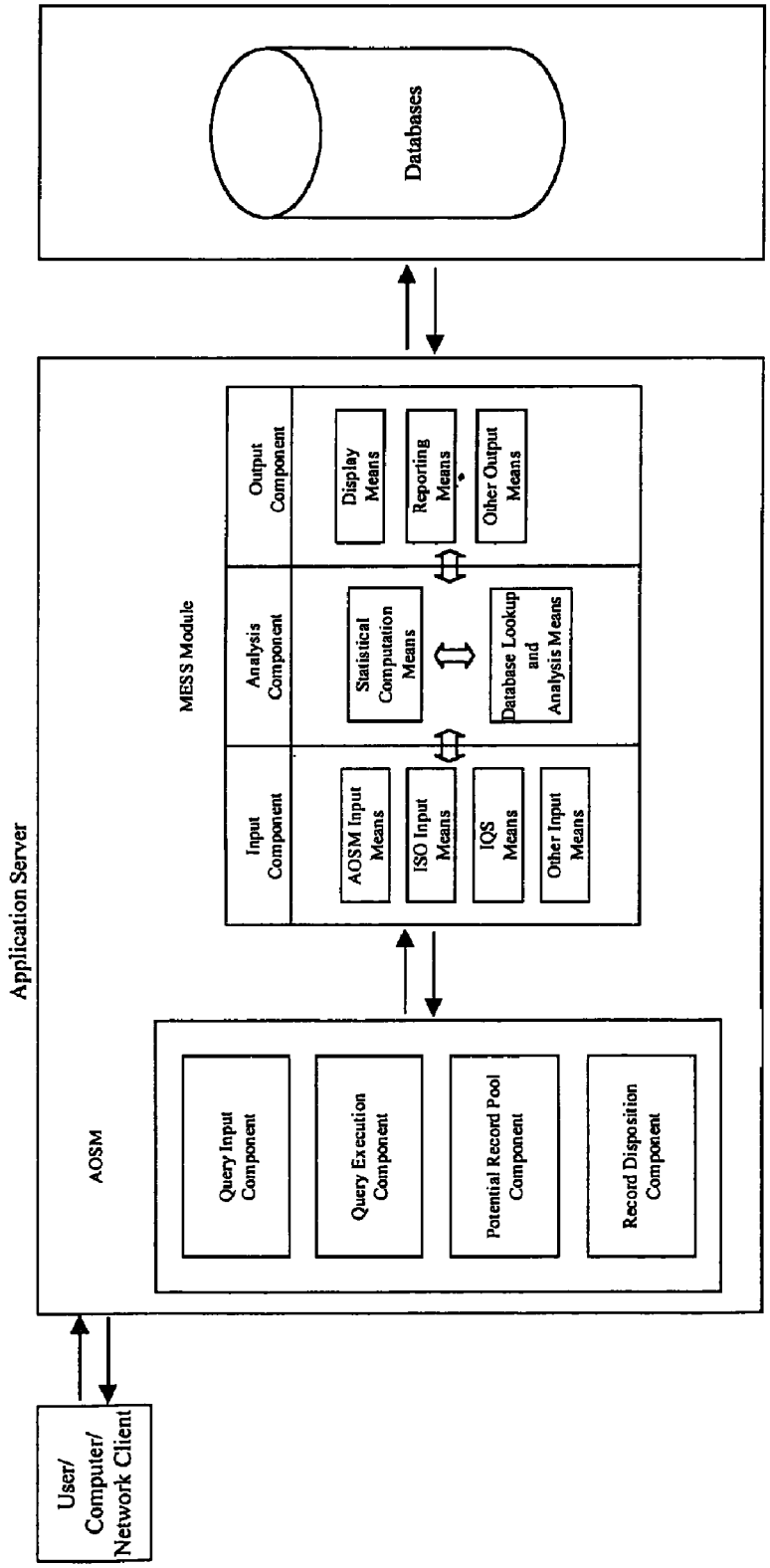
FIG. 2 is a drawing depicting the interrelationship among the Alpha-Omega Search Module (AOSM), the More Effective Search Sequence (MESS) module, and an informational database.

Referring now to FIG. 2, there is shown a diagram of the key functional components of the first preferred embodiment of the present invention, including the Alpha-Omega Search Module ('AOSM'), an Architecture, Structure, Organization and Format ('ASOF') informational database; and a More Effective Search Sequence Module ('MESS'). The primary function of the AOSM is to accept query input, where the query input is preferably comprised of both and only the first and last positional characters of each search term for one or more search parameters. For purposes of this disclosure, a search term is intended to refer to the word(s) or character(s) that are input to a particular search query. A search parameter is intended to refer to the entire data field upon which the search query is executed. A search query is comprised of one or multiple search parameter fields into which a user may input a variety of search terms. As an example, in searching for the name 'John Smith' in an informational database containing, at a minimum, one data field defined as First Name and a second data field defined as Last Name, the First Name and Last Name data fields are intended to be called Search Parameters, John and Smith are intended to be called Search Terms. Additionally, the first positional character of any term within any data field of any record will be referred to as the "Alpha" character; correspondingly, the last positional character will be referred to as the 'Omega' character. The combination of first and last positional characters will be referred to as the "Alpha-Omega" combination and may be abbreviated as the A-O combination.

Figure 3:
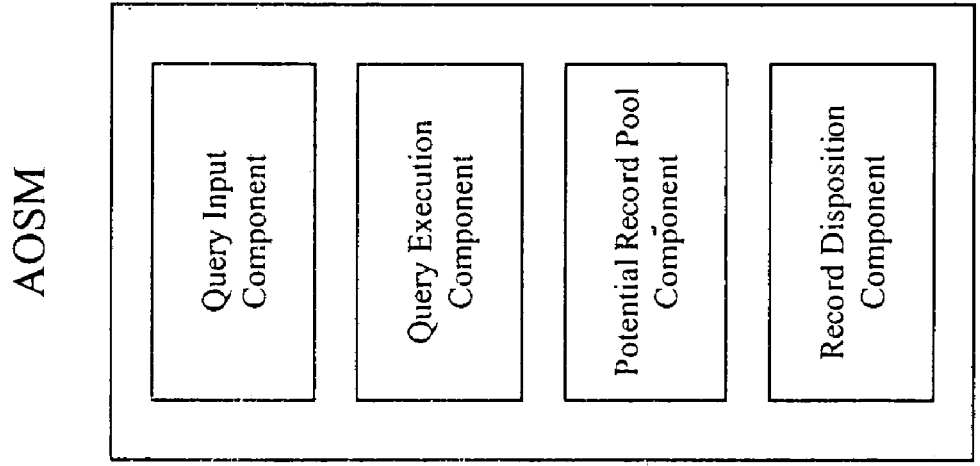
FIG. 3 is a drawing depicting the functional components of the Alpha-Omega Search Module.

Referring now to FIG. 3, the AOSM is comprised of the following components: a Query Input component ('QI'); a Query Execution component ('QE'); a Potential Record Pool component ('PRP'); and a Record Disposition component ('RD'). In this first preferred embodiment, the AOSM queries and retrieves records from one or more databases, where each database preferably is in an Architecture, Structure and Organization Format ('ASOF'), described more fully below. The invention identifies and retrieves a data record from an informational database by executing a search query in which only and both the Alpha and Omega positional characters of records contained in one or more searchable data fields within one or more databases are matched.

In a first preferred step of this method, the QI component of the AOSM accepts user input of the Alpha and Omega positional characters of one or more search terms. The QE component receives the query input and executes the search query upon the appropriate search parameter fields in the informational database. The QE further includes a means for executing searches based on any positional search characters of a searchable parameter field. A searchable parameter field is a database field capable of being queried, at a minimum, on the Alpha and Omega positional characters for records contained within that field. The QE component also includes a means for identifying a data record by matching or not matching a search query term.

In a second preferred step of this method, the QE component retrieves all records where the Alpha and Omega positional characters of the particular record match the Alpha and Omega positional characters of the search query terms. The retrieved records are submitted to the PRP component. The PRP is a sub-component of the AOSM and the primary functionality of the PRP component is to accept data records retrieved from the QE component; order or rank said retrieved records, accept input from MESS and other input sources; display said records and other input from various sources; and submit records for further processing, to the RD component, or to some other function.

The invention also requires that the AOSM execute the novel search query method upon one or more informational databases. Each database is preferably in the Architecture, Structure, and Organization Format. The ASOF database contains, at a minimum, at least one data field that is capable of being queried on the Alpha and Omega positional characters of data records contained within that data field. Additionally, each database may contain at least one data field that is capable of being queried on any one or more additional key characters positioned anywhere between the Alpha and Omega positional characters of data records contained within that data field. Preferably, the database is capable of being queried on each and every positional character for all records contained within one or more data fields. Database queries may be executed via a keyed-input method and system as well as a voiced-input method and system utilizing current AVR technology.

In a third preferred step of this method, the PRP submits the retrieved set of records from the initial query to the user for further querying, in the event that more than one record is retrieved. The PRP component interacts with the QI component and the QE component to accept and execute a second search query on the retrieved subset of records. As with the initial query, the user inputs the Alpha and Omega positional characters of the search term desired for a particular search parameter field. The PRP component receives this second set of retrieved records from the second query. In the event that more than one record is retrieved, the PRP will again interact with both the QI component and QE component to accept and execute a third search query on this second retrieved subset of records. This process is capable of continuing in this manner until the single desired or requested record(s) is located. Once the single desired record(s) is located, the PRP submits the record(s) to the RD component for further action based on the user's needs.

The unique and novel aspect of this particular search methodology utilizing only the Alpha and Omega positional characters is the understanding that the last alphabetic character in any search field is as powerful as the first character. In fact, it can be demonstrated that multiple parameter searches in which only the Alpha and Omega positional characters are used in search terms can be more effective than multi-character, sequential searches using only a single parameter. The underlying rationale is rooted in the inherent structure of an alphabetized database. When a typical forward-sequential, first-to-last character search is executed, a multitude of very similar listings is retrieved, with virtually little opportunity to differentiate, at an early stage of the search query sequence, the various records. As an example, in an informational database containing names and address of businesses in Indiana, the search query for the 'Indianapolis Athletic Club' located on 'Meridian Street', the typical forward sequential search would begin with the user inputting the letters "IND" under a common trigram approach. In this case, a multitude of records that match this query are retrieved, including, among others, all business listings that have Indiana, Indianapolis, or Industrial in their title. In contrast, when the methodology of the present invention is used, the initial search query would be "I . . . S", thereby eliminating all Indiana and all Industrial records. Understandably, other records that begin with I and end with S may also be retrieved. The methodology of this invention, however, is based, in part, on the understanding that multiple search parameters in which only the Alpha and Omega positional characters of search terms are used is more effective and efficient than using many characters in a forward sequential search with one parameter. In the example above for the search for 'Indianapolis Athletic Club', an initial search using 'I_S' for the business name and 'M_N' for the street name retrieves only a single record in the Indianapolis Business Directory. Additionally, new intra-field sub-search algorithms may eliminate 90 to 98 percent of most listing pools. They become particularly effective when linked to the existing trigram search algorithm and multiple search fields.

The Alpha and Omega positional characters in a search term are unique identifiers; in fact, these two positional characters are the most powerful identifiers and the combination of the two characters is especially powerful in retrieving desired records. It is important to note, however, that a primary object of this specific novel search methodology is to more efficiently retrieve a desired record by eliminating similar, yet incorrect records more efficiently. The invention utilizes several approaches to achieve this increased efficiency. As noted above, a single search query utilizing only and both the Alpha and Omega positional character combination for a single search term eliminates similarly spelled, yet incorrect records, and results in a PRP of dissimilar and less ambiguous records. The addition of a second search query utilizing only and both the Alpha and Omega positional character combinations for an additional search term not only further eliminates incorrect records, but significantly increases the probability of retrieving a desired record due to the highly unique combination of two very powerful Alpha and Omega positional character searches. Not only will a multiple parameter, Alpha and Omega positional character-only query significantly increase the probability of retrieving a desired record, but the search methodology of this invention further provides for a novel sequencing or arranging of search queries in order to increase the search efficiency even more.

In a preferred aspect of this embodiment, the invention is additionally capable of determining, for each informational database, the statistical frequency distribution (frequency of occurrence (%)) of each and every unique first and last positional character combination for every data record within one or more searchable data fields. This frequency of occurrence information may be determined in a predetermined or dynamic manner. The frequency of occurrence information is further utilized to hierarchically arrange and execute multiple search queries in order of a most-restrictive to a least-restrictive query. Moreover, the invention is capable of determining and utilizing the statistical frequency distribution information for all records within a database as well as for any subset of records, including those records retrieved by a prior search.

Figure 4:
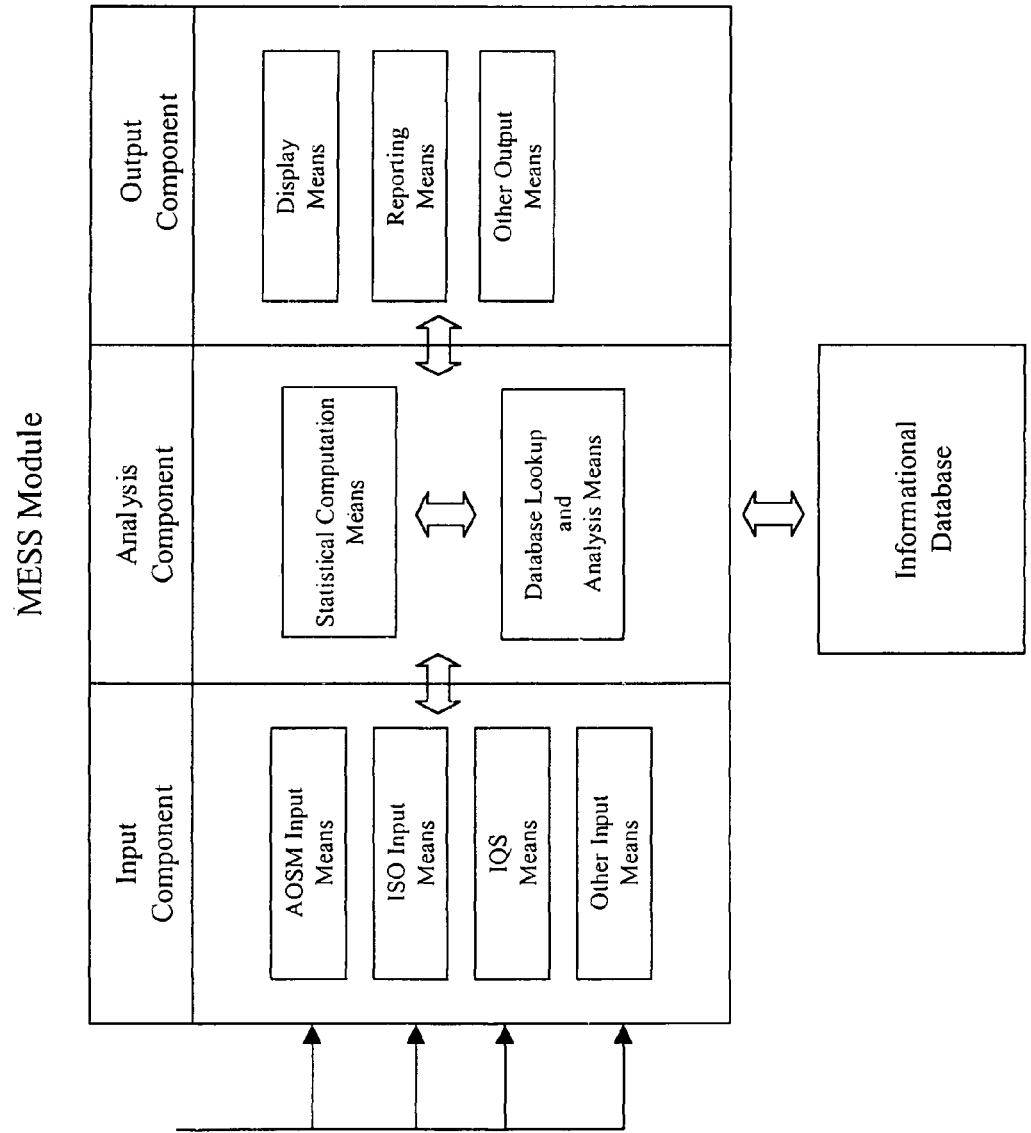
FIG. 4 depicts a diagram of the key components capable of performing the MESS functions.

Referring now to FIG. 4, a diagram of the key components capable of performing the functions described in this preferred aspect is shown. The More Efficient Search Sequence ('MESS') module is comprised, at a minimum, of three primary components: an Input Component; an Analysis Component; and an Output Component. The Input Component is comprised of multiple input means, including, but not limited to an input means for the AOSM, the ISO and IQS, described more fully, below, and any other input means, as required. The Analysis Component is comprised, at a minimum, of a statistical computation means and a database lookup and analysis means. The Output Component is comprised, at a minimum, of a display means, a reporting means and any other means, as required. All three of these components of the MESS are capable of exchanging information among one another as required. In addition, the Analysis Component is capable of interacting with any informational database by utilizing the database lookup and analysis means.

Figure 5:
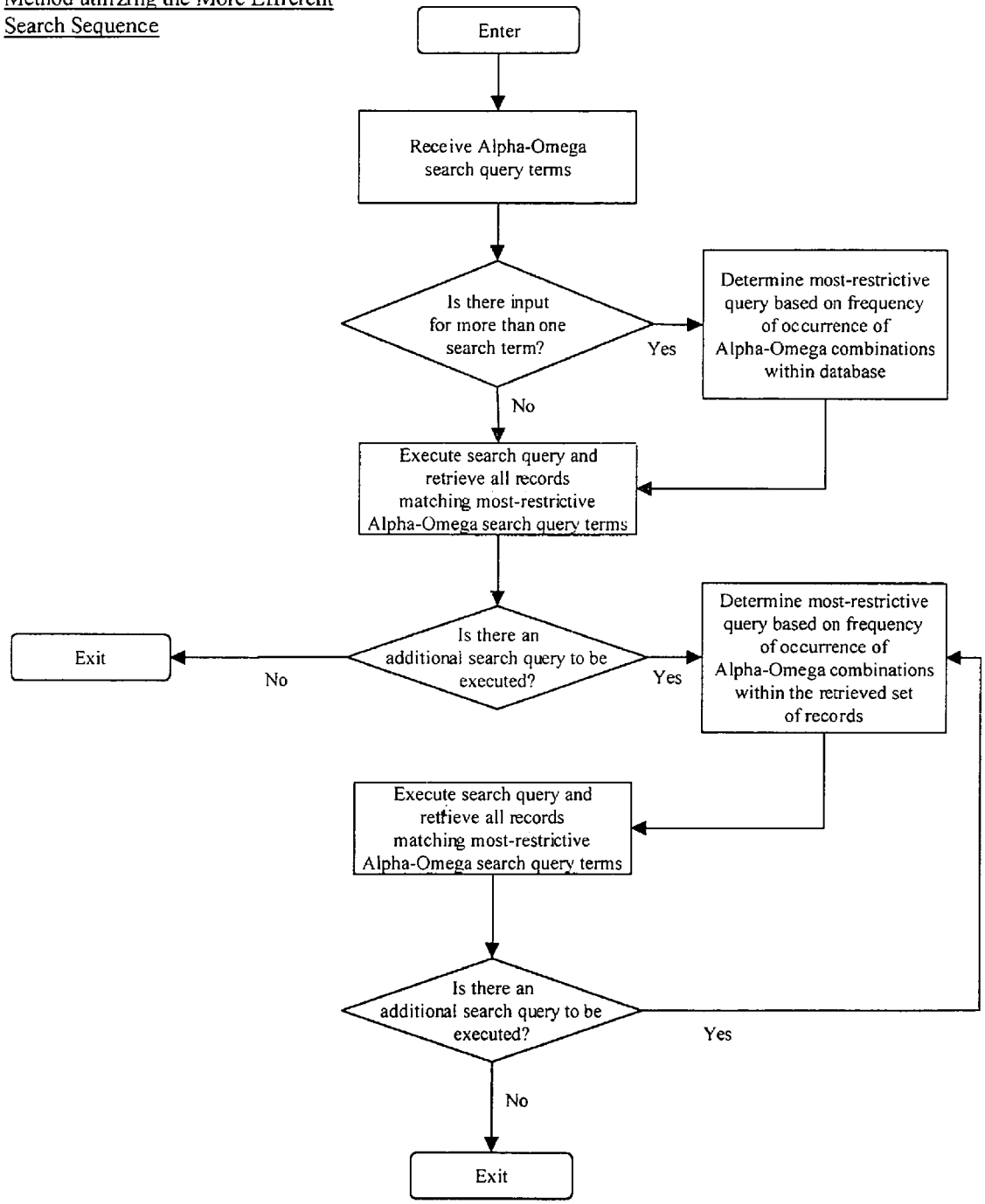
FIG. 5 is a flowchart showing a preferred functionality of the MESS method in which multiple search queries are ordered and executed according to a preferred MESS analysis.

FIG. 5 is a flowchart showing a preferred functionality of the MESS method in which multiple search queries are ordered and executed according to a preferred MESS analysis. A preferred order of query execution is from a most-restrictive to a least-restrictive query. Preferably MESS orders queries based on the frequency of occurrence of the A-O combinations for multiple search terms. A most-restrictive query is the query that generates the fewest number of matching records, i.e. the A-O combination of a search term with the lowest percent occurrence in the database. Preferably, the resulting set of retrieved records matching this initial query are returned in the form of a PRP, either displayed to the user for further querying input or held in cache memory as a PRP for further analysis. In any event, this resulting PRP is used as the basis for the frequency of occurrence calculations for the remaining search terms. Once re-calculated, the search term with the lowest percent frequency of occurrence within this initial PRP is executed. Again, a new, second PRP is created, PRP2, and the frequency of occurrence for any remaining first and last positional search terms is re-calculated from PRP2 and the most-restrictive query is then executed. This process continues in this fashion until the desired record is located or a PRP of sufficient probability of identifying the desired record is created.

The primary function of the MESS is to order search queries in a hierarchical manner and relies on the frequency distribution of positional characters within one or more particular search terms, where said frequency distribution is determined through a statistical analysis of positional characters of data records within one or more data fields within one or more ASOF databases. It is important to note that the MESS preferably relies on the frequency distribution of the A-O combinations for data records within one or more data fields in order to work with the AOSM. However, it is envisioned that the MESS will also function by relying on the frequency distribution of any key positional character or combination(s) of positional characters, including entire words or phrases included in one or more particular search fields. Moreover, MESS is capable of utilizing any type of statistical data derived from any characteristic of one or more particular databases. MESS utilizing the AOSM should be interpreted as only one method of uniquely identifying and retrieving records by ordering and executing search queries based on statistical frequency distribution of key positional characters. MESS is capable of prioritizing and executing multiple parameter queries as well as multiple, single parameter queries.

In another preferred aspect, the invention is capable of determining and utilizing Virtual Search Parameters ('VSPs') in search queries executed upon one or more informational databases. A VSP is a search parameter that is derived from an objective or subjective attribute of records contained within one or more data fields. The primary objects of a VSP include: more efficiently eliminating similar, but incorrect data records; and more efficiently increasing the probability of identifying a correct listing.

VSPs may be based on either an objective or subjective attribute of records within a single or plurality of data fields. Objective attributes are those attributes that are quantifiable or physical and are considered 'universally accepted' facts. As such, objective VSPs are generally 'true' or 'false' for each record universally for each user of the system. Subjective attributes are those attributes that are generally qualitative and relative in nature and may be based on any personal or non-objective attribute or characteristic. As such, subjective attributes are not necessarily 'true', or the same, for each user of the system.

VSPs may be derived from objective or subjective attributes of a single record or a group of records, contained within a single data field or a group of data fields, belonging to a single informational database or multiple, related databases. Examples of an objective VSP include statistically-based characteristics of a particular informational database, such as the actual frequency of occurrence for a particular A-O combination. A corresponding subjective VSP includes categorizations based on the actual frequency of occurrence, such as common and uncommon.

The invention contemplates utilizing any number and variety of objective and subjective VSPs as a part of the search methodology. The invention contemplates, but is not limited to, utilizing the following objective and subjective VSPs as identified in the table below:

| Attribute | Objective VSP | Subjective VSP |
|---|---|---|
| Length | # of characters | Short, Average, Long |
| Language | English, Greek, etc. | Foreign |
| Frequency | Actual frequency of occurrence of positional characters or combinations of positional characters | Very common, common, uncommon, very uncommon |
| Location | Actual City, State, | 'City', Suburban, Rural, etc. |
| Business Type | Yellow Page Classifications | Medical, Professional, etc. |
| Complexity | Actual # of syllables; Actual # of phonemes | Difficult, Hard, Multiple Syllables, Multiple Phonemes |
| Purpose or Use | Fax, Police, etc | Emergency, Data, etc. |

VSPs may be created in either a predetermined or dynamic manner. Preferably, the invention creates VSPs in both a predetermined and dynamic manner. Each possible VSP, whether objective or subjective, may be further classified according to whether the VSP is an absolute VSP or a relative VSP. An absolute VSP is a VSP in which the specific attribute used to define the VSP remains constant for a particular record at all times. A relative VSP is a VSP in which the specific attribute used to define the VSP may change for one or more records. An example of an absolute VSP is the subjective attribute for location, such as 'Rural.' It is anticipated that the designation of the subjective VSP for location of a particular record as 'Rural' would remain 'Rural' at all times. Examples of a relative VSP are both the objective and the subjective VSPs for frequency of occurrence. The objective VSP for frequency, i.e. percent occurrence for a particular A-O combination, may change, depending upon the particular set of records that combination is calculated from. For example, a percent occurrence for the A-O combination of 5%, if calculated from an entire database, is expected to be different than the percent occurrence of that same A-O combination if calculated from a subset of database records, such as a PRP. Correspondingly, the subjective VSP for frequency, such as 'common' or 'uncommon' would also change as the set of records used to derive the subjective VSP classification changes. Preferably, absolute VSPs are created in a predetermined manner, while relative VSPs may be calculated in a dynamic manner.

VSPs may be created using current database programming technology. One or more classification descriptors are created for the particular VSP. Preferably, each VSP has a one-to-one relationship with a particular data field. Each classification descriptor has a unique set of rules, i.e. programming code, to follow in order to determine which classification descriptor should be assigned to which records.

The use of VSPs within the invention's search methodology is novel in that a particular VSP is capable of more effectively and efficiently increasing the probability of successfully locating a desired record. The probability of successfully locating a desired record is achieved in one of several alternate, yet complementary ways. First, the VSP may be used to efficiently eliminate many similar but incorrect records. An example would be the use of the subjective VSP for frequency of occurrence of the A-O combinations. If the A-O combination for a search tem is a highly unique combination of letters, i.e. whether the combination of letters occurs with a very low frequency, within a particular database, then a user of the system may execute a search query utilizing the subjective VSP for frequency of occurrence for A-O combinations to eliminate all records where their particular A-O combinations occur with a high frequency. In this case, the user would execute a search query using a standard Boolean operator, "NOT", in conjunction with the subjective VSP "Common" to eliminate all records which have been categorized as "Common." The net result is to effectively select all records which have not been categorized as "Common" for further analysis. The resulting retrieved record set would contain all those records categorized as "Uncommon" and "Very Uncommon," among other categorizations, potentially. This resulting set of records contained within this first PRP contains the desired record, along with other records, with only a single search query having been executed. Moreover, the probability of retrieving the desired record is increased relative to a traditional search technique. This increased probability results from several factors. First, the resulting PRP from a VSP-based search query is considerably smaller than from a conventional search methodology. Moreover, the retrieved set of records in the PRP are dissimilar in spelling and contain a much more diverse and unique combination of records. In addition to eliminating incorrect records more efficiently, a VSP can be utilized to select a subset of records based on the frequency of occurrence. In this case, the VSP 'Very Uncommon' would retrieve a very small subset of records which match the 'Very Uncommon' classification.

As described above, subjective VSPs, such as the frequency of occurrence of A-O combinations are capable of being dynamically calculated. As such, the invention is capable of calculating the frequency of occurrence for A-O combinations for all records within any given subset of database records and at any time. This novel feature may be utilized at any time and for any purpose as required by the invention's search methodology.

In addition to the objective and subjective VSPs, described above, the invention further presupposes a VSP based on a non-positional search character. The non-positional search character query entails a user inputting a single desired character for a record, where such character is preferably located at any position within the intervening characters between the first and last positional characters. This non-positional search character VSP, as well as the objective and subjective VSPs, are especially important to this invention's search methodology as it relates to voiced-input queries using AVR technology, described more fully, below.

Figure 6:
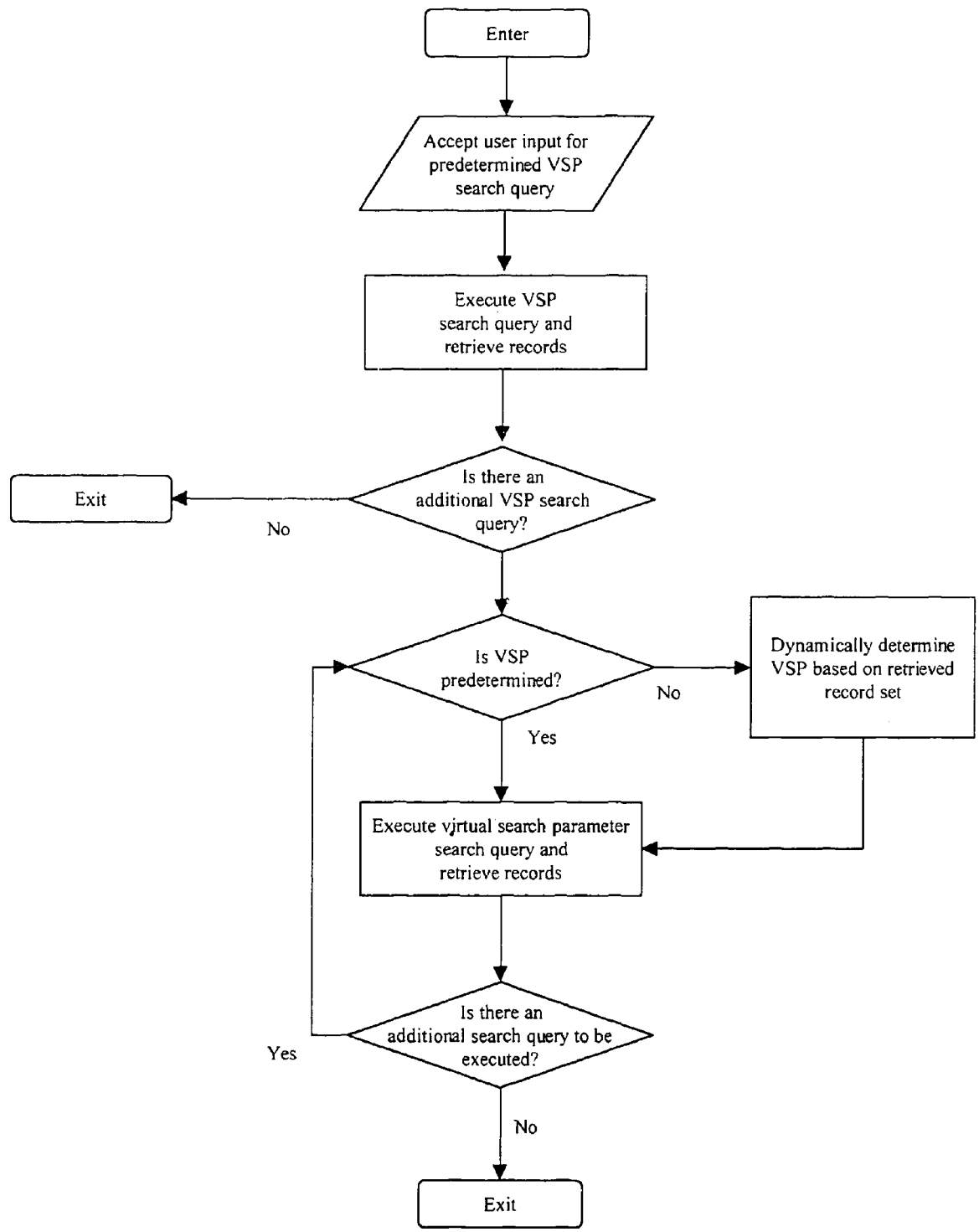
FIG. 6 is a flowchart depicting a search methodology utilizing virtual search parameters

FIG. 6 depicts a flowchart of a search methodology utilizing virtual search parameters.

In another preferred aspect, a novel method and system for retrieving records from an informational database utilizing current AVR technology is taught. The method consists of initially receiving vocalized input of both the first and last positional characters for one or more search fields. The vocalized input may consist of either the first and last positional characters, where each desired character is voiced individually, or the first and last positional phonemes, where each phoneme is voiced individually. Alternatively, the desired first and last positional characters or phonemes of a particular search field may be isolated from the vocalized input of an entire search term. Under either approach, i.e. whether the first and last positional characters or phonemes are input individually through voiced utterances, or whether the first and last positional characters or phonemes are isolated from whole-word search terms input through voiced utterances, the method utilizes these first and last positional characters or phonemes to execute a database search. This database search may be executed in one of several alternative methods. Each method relies on a novel application of current AVR technology.

A first preferred method of executing a voiced-input search includes speech-to-text translation of the voiced input, including speech-to-text translation of characters or speech-to-text translation of phonemes. As is taught in current art, every phoneme may be represented by some combination of alphabetic letters. Under the speech-to-text translation method utilizing characters, and not phonemes, the search query is executed upon the database in the same manner as a keyed-input search query. Under the speech-to-text translation method utilizing phonemes, the database may be structured or formatted in such a way as to allow for searching on the alphabetic text equivalents of the first and last positional phonemes. Specifically, the database may contain the alphabetic text equivalents for at least the first and last positional phonemes for each data record contained within one or more searchable data fields. These alphabetic text equivalents for the first and last positional phonemes may be located and accessed in any manner using current database programming methods and systems.

A second preferred method of executing a voiced input search utilizes current voiceprint or phoneme audiogram recognition and matching technology to first interpret the voiced first and last positional phonemes. Once interpreted, the method next retrieves those database records where the audiograms or voiceprints of the interpreted first and last positional phonemes of the search query match the audiograms or voiceprints of the first and last positional phonemes of the particular data records.

It is anticipated that AVR speech-to-text translation for the 36 alphabetic characters of the English language, as well as the approximately 41 distinct and unique phonemes of the English language can be easily performed utilizing state-of-the-art speect-to-text translation technology. One unique insight with this invention's methodology is that less input may lead to more accurate results, in that the search methodology utilizes a less complex speech-to-text translation method that results in a greater likelihood of retrieving a desired record due to the lessened chance of incorrectly translating a more complex word or sound.

The PRP that is formed from the use of AVR with the Alpha-Omega search methodology is comprised of a set of retrieved records consisting of dissimilar spellings and phonemic sounds. This search methodology creates very small, highly AVR-efficient PRPs with an automatic AVR procedure to eliminate or select records based on phonemic sounds of both the first and last positional characters for one or more particular search terms.

In the context of utilizing the Alpha-Omega search methodology within an automated directory assistance environment utilizing current AVR technology, advantages over prior art include: exact spelling or full phonemic interpretation or translation is not required; consumption of AVR resources is not as great; AVR call containment is improved while AVR confidence scores increase in that matching is virtually 100% when the intervening characters or phonemes are excluded; and, finally, AVR speed is increased.

In a second preferred embodiment of the invention, the novel search system and method of the first preferred embodiment is performed within a directory assistance call center environment, preferably utilizing a live call handling agent and both speaker-independent and speaker-dependent AVR technology.

Figure 7:
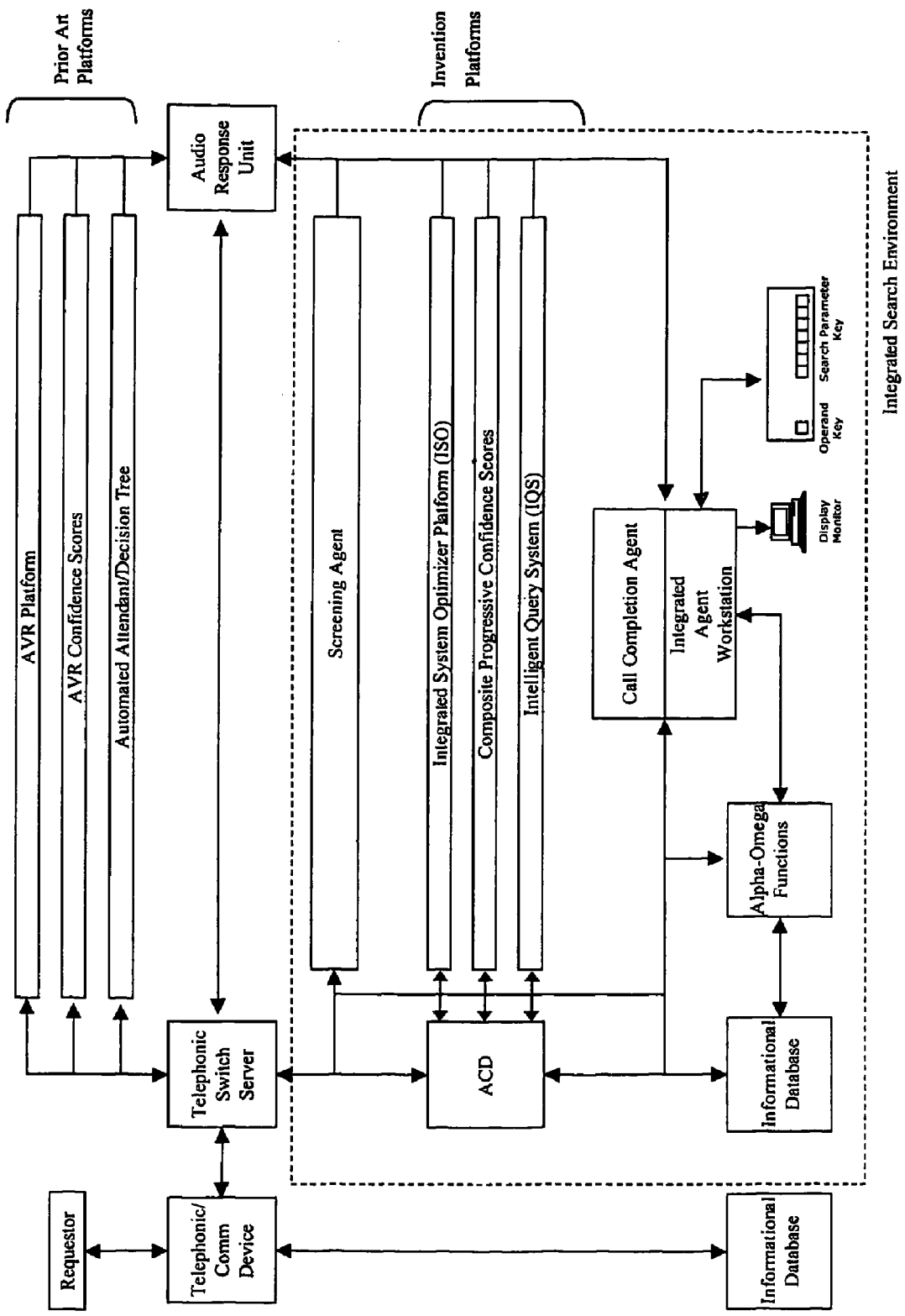
FIG. 7 is a representational diagram showing the components of a directory assistance call environment utilizing the method and system of the present invention.

Referring now to FIG. 7, a data retrieval system includes telephone directory assistance system having many features commonly encountered in current systems today. For instance, a computer has access to a memory device containing one or more telephone directory databases, or other types of information databases. As in typical current systems, a live operator has the ability to communicate with the computer via a conventional keyboard, and the computer has the ability to communicate with the operator via information displayed on a video terminal screen. The operator communicates with a telephone via a conventional headset that includes a headphone mounted speaker and a microphone. The telephone communication device is connected to a calling customer via a telephony switch server. In this way, an operator can be within a call center operation or independently located and connected by telephony switch server via a public communications channel, such as the Internet, or a private or virtual private circuit, such as a dedicated line, integrated services digital network, or frame relay access device. Additionally, a voice communications interface, which includes a speech recognition system, is positioned to allow the operator to communicate with the computer via voice utterances into a headset microphone. Additionally, a direct voice communication interface is positioned between the calling customer and the computer. The direct voice communication interface includes an independent speech recognition system capable of converting the identifying information spoken by the calling customer into an independent searchable query that is available to the means for searching the computer, as described below.

In one preferred aspect of this second preferred embodiment, a live call handling agent utilizes a personal phoneme database to more efficiently and more effectively formulate and execute search queries in accordance with the system and method of the first preferred embodiment. In addition to the novel search methodologies and corresponding functional components necessary to effectuate said methodologies, as described above in the first preferred embodiment and all related aspects, this preferred aspect of the second embodiment of the invention further includes the use of a personal phoneme database for a live call handling agent utilizing current speaker-dependent AVR technology. It is important to note that the use of personalized speech recognition for a live call handling agent has been awarded patent protection to the inventor(s) of this present invention, see U.S. Pat. No. 6,243,684 and U.S. Pat. No. 6,643,622 B2.

In accordance with this first preferred aspect of the second preferred embodiment, each individual live call handling agent utilizes a unique personal phoneme database, where each unique personal phoneme database is comprised of one particular agent's unique alphanumeric phonemic utterances and AVR vocabulary. An agent's personal phoneme database includes an individual agent's speaker-dependent phonemic sounds for alphanumeric characters and phonemic equivalents as well as an agent-specific vocabulary for common or frequent words, phrases, or database commands. Agents may utilize individual speech vocabularies of the 36 alphabetic characters as well as simple words for operand command statements. The AVR translation of this very limited, but powerful vocabulary and phonemes allows the agent to achieve 100% AVR confidence scores while retrieving records. This aspect of the invention further contemplates the use of a plurality of agent-specific databases instead of 'one database fits all' of today's system. For instance, the agent-specific database may include agent-specific audiograms corresponding to aspects of a database record, such a first and last phonemes of one or more search fields.

In a second preferred aspect of this second preferred embodiment, a composite progressive confidence score is utilized to more effectively and more efficiently formulate and execute search queries. Generally speaking, the progressive composite confidence score (PCCS) is derived from a plurality of sources, including all components of AVR methods and systems as well as from all components of the Alpha-Omega search method and system. In particular, the PCCS is determined from a plurality of input components, including a query formulation component, an initial search query component, and a subsequent search query component. The method of utilizing the PCCS is comprised of the following steps: determining a first confidence score associated with formulating a desired query; determining a second confidence score associated with executing an initial search query; determining a third confidence score associated with executing a subsequent search query; determining a combined confidence score from the first three confidence scores; selecting a record where the combined confidence score meets a minimum threshold; and providing feedback to either a user of the system or to any computer program associated with the system.

With respect to the first determining step relating to formulating a desired search query, a first confidence score is determined in part from both the confidence of correctly interpreting a voiced utterance search input as well as from correctly interpreting a keyed search input. It is expected that a keyed input confidence score will virtually always be 100%. With respect to the confidence score associated with correctly interpreting a voiced utterance search input, it is expected that this confidence score will be calculated from both speaker-independent AVR systems as well as speaker-dependent AVR systems. This first confidence score results from an AVR system's ability to correctly interpret or translate a voiced utterance. This first determined confidence score includes a combined confidence score of speaker-independent and speaker-dependent translations/interpretations The invention contemplates utilizing a confidence score associated with any currently-used speaker-independent scoring methods and systems. Ambiguity is a very large problem for AVR systems. Current AVR systems must request multiple attempts to achieve confidence scores above a threshold, determine proper translation for similar sounds (C or E). Today's AVR confidence scores do not utilize the Alpha-Omega format for search terms in today's directory assistance environment.

With respect to determining a confidence score relating to executing an initial search query, this step of the method derives a confidence score associated with matching the search query terms with records in the database. This matching includes matching any one or more of the following: first and last positional elements; any intervening element between first and last positional elements; any virtual search parameter. Moreover, determining an initial query confidence score includes a confidence score associated with the number of matching records relative to the initial query set of records as well as determining an initial query confidence score includes a confidence score associated with a single record relative to the retrieved set of records. Finally, determining an initial query confidence score includes a confidence score associated with the statistical frequency of occurrence of one or more elements in a search field, including one or more of: first and last positional elements; an intervening element between the first and last positional elements; any combination of elements; whole words within a search field.

With respect to determining a confidence score relating to executing a subsequent search query, this step of the method derives a confidence score associated with matching the subsequent search query terms with records in the database. This matching includes matching any one or more of the following: first and last positional elements; any intervening element between first and last positional elements; any virtual search parameter. Moreover, determining a subsequent query confidence score includes a confidence score associated with the number of matching records relative to the subsequent query set of records as well as determining a subsequent query confidence score that includes a confidence score associated with a single record relative to the retrieved set of records. Finally, determining a subsequent query confidence score includes a confidence score associated with the statistical frequency of occurrence of one or more elements in a search field, including one or more of: first and last positional elements; an intervening element between the first and last positional elements; any combination of elements; whole words within a search field.

With respect to determining a combined confidence score, the combined confidence score is derived from the first determining confidence score and one of or both of the second determining confidence score and the third determining confidence score.

With respect to selecting a record where the combined confidence score meets a minimum threshold value. The method of the PCCS is capable of utilizing virtual thresholds of flexible confidence scores calculated for each PLP and for individual listings or records. The current fixed confidence scores may not be appropriate for all AVR transactions.

With respect to providing feedback, this method is capable of providing feedback on any single confidence score or any combination of confidence scores. Moreover, the method is capable of providing feedback to a user of the system as well as to a computer program associated with the system. Finally, the method is capable of providing feedback at any time throughout a search. The feedback may consist of statistical data.

A novel aspect of the progressive composite confidence scores is the combining of multiple AVR factors with multiple database characteristics and statistical calculations for initial, subsequent, and final PLPs to produce a composite confidence score with relative and variable weights assigned to various positional elements to identify the Most Likely Requested listing or record. Moreover, multiple, progressive AVR audiogram match attempts for PLPs with a smaller number of most likely requested listings will achieve higher AVR confidence scores and percent of calls contained within the AVR system.

In a third preferred aspect of this second preferred embodiment, a system and method that utilizes an integrated system optimizer and an intelligent query system to dynamically assist a call handling agent or automated attendant is utilized to formulate and execute more effective and more efficient search strategies in accordance with the first preferred embodiment of this invention.

The Integrated System Optimizer (ISO) is a supervision and monitoring system that is electronically interconnected with the various automatic voice recognition, automated attendant store and forward, agent workstation, database retrieval and automatic call distributor (ACD) systems currently found in today's current directory assistance call handling environments. The ISO compares individual record positional elements and attributes to determine the specific positional element information that will disambiguate, eliminate the most records or identify the desired record. In particular, the ISO is capable of determining the size of the potential record pool for each of the subsequent positional element data points.

The ISO receives search progress and status for each database query and the ISO selects the query from a list of appropriate queries for missing responses requiring clarification or AVR confidence scores below a threshold.

The data provided includes but is not limited to AVR confidence scores for each positional element; keyed input for each positional element; number of database records identified; potential record pools formed by positional element provided input, probability of search query matching individual records.

The ISO formulates an IQS for the automated attendant system or the call center agent. Moreover, the ISO communicates the specific query to the IQS automated attendant store and forward system. Additionally, the ISO communicates search status to agent workstations.

The Intelligent Query System (IQS) formulates a query for an automated attendant decision tree to elicit a customer response to provide specific positional element data or information that will disambiguate or identify records in a potential record pool. Moreover, the IQS is capable of formulating a customer or agent response to a specific question to obtain data for missing (void) data or to 'disambiguate' a group of records. The following is an example of how the ISO and the IQS work together to formulate the most effective search query. If the ISO determines from a customer input query utilizing a prior art automated attendant decision tree that a PRP will be comprised of 3 listings, the ISO will compare the 3 listings. The ISO will next determine that there are 3 different Omega characters for the street name, 3 different street types, and 3 different first names. The IQS query for the customer in the automated attendant decision tree would be—

"Do you have the spelling of the last letter in the street name?"

"Is this address a street, road, etc."

'Do you have the spelling of the first and last letters of the first name?"

The ISO and IQS use today's AVR platforms, database retrieval systems, 'decision-tree' platforms. For example, IQS would simply add an AO prompt. ISO is located in the database retrieval platform but formulates the IQS prompt based on status of database search algorithm; a statistical module in the database platform combines AVR confidence scores with statistical AOSA and ASOF database data, etc.

The IQS with screening agents 'added' to the 'decision tree' will contain calls within the AVR system.

The utilization of the personal phoneme database, the progressive composite confidence score, the ISO and the IQS within the present invention's search methodology can be demonstrated using the following example. A calling customer is connected to an automated attendant system as is currently utilized in present systems. The customer is prompted for a directory assistance inquiry, and the customer provides a voiced input for the listing "C. Smith" on "Maple Avenue." The AVR for the automated attendant system calculates the confidence score for the first name, in this example, the letter 'C" to be less than 50%. This low confidence score is due in part to current speaker-independent AVR systems' difficulties in interpreting certain letters and sounds, such as "C" from "E."

The ISO of the present system recognizes that the confidence score of the call in queue is below a minimum threshold and adds a screening agent to the automated attendant system. The agent recognizes that the customer's request is for "C". The agent utters "C" and the agent's personal phoneme database easily interprets the agent voiced-utterance with over 99% confidence. The ISO then determines that the PRP of the matching records in the database is 1,200. The ISO then adds a screening agent to the customer in the automated attendant queue with a request for a street name. The agent monitors the customer's recorded response for the address and keys or voices "M . . . E" for Maple. The PRP resulting from this address query is 1. The ISO then instructs the call to be routed to the Audio Response Unit.

In a fourth preferred aspect of this embodiment, agent operand commands are utilized to direct a specific computer program instruction or step. These agent operand commands are composed of an action, a linking, and an object word. The combination of action, linking and object command words allows for the possibility of formulating multiple database search queries. Action words include "search", "expand", "delete." Linking words include Boolean operators, specifically including "And", "or", "all", "except", "only", "not." Object words include an element of a database record field, including any positional element of the field; object includes virtual search parameters, including the virtual search parameter categorizations of 'common' and 'uncommon.'

A Boolean-type logic with 'and-or-all-only' coupled with and 'action' step (search, delete, etc.) directed to an object such as a specific directory listing or record characteristic (very common, common, etc.) or record length provides an almost infinite number of agent commands to direct and control various systems in an AVR database retrieval system. For example, Delete All Common listing; Search Only Average Length, etc. will reduce PLPs by 90-99%. This will cause a dramatic increase in AVR efficiency and accuracy. This PRS Boolean type command vocabulary includes, but is not limited to, expand, delete, add, search, or, only, numeric, common, uncommon, uncommon-common, other, title, all, or alphanumeric character and any combination of two or more PRS Boolean-type words that may or may not be associated with various work station keyed actions.

Examples includes—

"Search all street types Point'. The utterances would be search, all, Point. (The Search Parameter key would direct the search algorithm to the Locality field.)

"Search 'I' and 'E' Omega primary. The primary search Primary key would instruct the search algorithm to search the database to formulate a PRP with all records ending in 'I or E', etc.

The agent's operand command vocabulary may consist of single word instructions or sequential linked commands for more complex Boolean type instructions. A single command, 'Expand,' may direct the system to search the next geographic area or a sequential multiple word voiced command such as 'search I, E, or Y" associated with an activated primary name parameter key would be instructions for searching the last or omega character for common spelling variations of primary names. Agent command vocabulary further includes categorizations such as Yellow Page classifications, etc.

In a preferred embodiment, agent operand commands are vocalized, but can be keyed, or a combination If vocalized, commands can be executed using personalized, speaker-dependent (PSR) phonemic or whole-word utterances.

In a fifth preferred aspect of this invention, an integrated agent workstation is utilized to more effectively and efficiently formulate and execute search queries using the Alpha-Omega search methodology of the first preferred embodiment. The understanding of the insights into the Alpha-Omega search method and unique database characteristics lead to the fundamental need for an integration of the agent's work tool, the agent's workstation, with database architecture, search algorithms, search parameters and AVR technology.

The present invention utilizes dedicated keys that are directly associated with the ASOF database to effectuate this integration. It is envisioned that the agent's workstation console will incorporate unique and separate multiple function keys associated with each search parameter. It is also envisioned that an speaker-dependent AVR or PSR key will be utilized to activate agent voiced operand commands to integrate search algorithms and the database retrieval system. This PSR key is included in order to inform the AVR and database retrieval systems that a specific agent will vocalize a specific command with an operand statement composed of words or phrases from the operand vocabulary. Moreover, the invention presupposes that certain commands can be associated with dedicated workstation keys. These dedicated workstation keys are associated/linked with the revised database, including specific links to record fields, positional elements of record fields, and with virtual search parameters The agent workstation is capable of receiving ISO data that displays search status, composite progressive confidence scores, potential record pool size, VSP and other data. In particular, the integrated agent workstation is capable of receiving ISO data derived from ACD queue statistics for average seconds of delay for individual calls and customer has previously abandoned call while in queue. Additionally, the integrated workstation is capable of receiving ISO data relating to the number of records in the potential record pool. The integrated workstation also is capable of receiving from the ISO suggested agent actions and their impact on reducing the number of records in the PRP. Finally, the integrated workstations receive the specific record or records and their individual composite and progressive confidence scores.

Given the foregoing discussion, it is helpful to summarize a typical, preferred call flow in a directory assistance environment utilizing the invention's novel features. Attachment 2 summarizes the preferred call flow. Generally speaking, calls originate with a calling customer. Once the caller originates a call, the call is placed in queue and typically first serviced by a prior art automated attendant service. In the event the automated attendant service is not able to perform the caller's request, or in the event that a particular confidence threshold has not been achieved, the ISO function of the present invention monitors the call progress, analyzes the positional elements of the caller's request, compares the positional elements with positional elements of the database to determine potential record pool, and then either routes the call to an automated response unit or adds a screening agent to utilize the personal phoneme database to complete the search query. The ISO further communicates with the IQS to formulate more effective search query. The screening agent may be further utilized to complete this query, or, in the event a screening agent is not utilized, the ISO may direct the IQS to query the calling customer utilizing the automated attendant service while still keeping the calling customer in queue.

Attachment 2 is a study that demonstrates the effectiveness of the invention's search methodology. The study includes all directory listings for residents in Indianapolis whose last name begins with the alpha element 'A." In this study, the first and last positional element query "A . . . G" is queried on the Indianapolis directory assistance database:

1. This initial query creates a PRP of 340 records, with 14 very different PRPs based on spelling or phonemic sounds.
2. An AO first and last positional element and any uncommon first name or street name will create a PRP of 1 or a very small PRP of 2 or 3.
3. ISO and IQS would identify an Omega for a first name or street name in order to disambiguate
4. Screening agents would provide speaker dependent confidence scores to disambiguate "C" vs. "E", etc.
5. VSPs for "short" would separate Alig (4 characters) into a PRP of 13. Any intervening positional character for street name would create a PRP of 1.
6. 'Armstrong' would be classified as a "long" VSP. Eliminating or deleting Armstrong in this PRP would eliminate 294 of the 297.
7. An ISO/ASOF database 'cache' statistical confidence score would route this call to the ARU.
8. Agent Operand commands for the non-positional 'K' would help find a polish name Adonski or Adonske Attachment 3 is a table of Indianapolis street names with percentage frequency identified respectively for the first and last numeric characters for each letter of the alphabet and numerical designations, respectively. By comparing the Alpha and Omega position characters percentage frequency, one can easily see that the last positional character can be very powerful in finding a particular requested database record.

Attachment 4 is a table of reverse last Omega frequency in relation to the Indianapolis telephone directory. This helps to show that in some instances eliminating the subsets of the database by knowing the frequency of occurrence of certain letters at certain positional characters can be a shortcut in arriving at a requested database record.

Attachment 5 is a comparison of Alpha Omega frequency relationships for residential listing s in the primary named search field for San Diego and Indianapolis. This table helps illustrate that one Alpha-Omega letter combination may be uncommon in one database, it may be extremely common in another. This factor can be exploited into the virtual search parameters for different databases.

Attachment 6 is a researched example showing several search strategies, for finding a requested database record for Don Hornback, on Fathom Crest in the Indianapolis phonebook database.

Attachment 7 is an example showing a typical search strategy and results and a search strategy according to the present disclosure on the right. Column labeled "KS" identifies key strokes in the order of entry.

Attachment 8 is a directory assistance worksheet example and several different searches and results for a requested database record for James Williamson on Candlestick Way. The first search strategy is one according to the prior art, whereas the second two search strategies illustrate different aspects of the present disclosure.

Attachment 9 shows a more detailed explanation regarding searches for James Williamson on Candlestick Way in the Indianapolis telephone directory database.

Attachment 10 is also an additional details regarding searches for database record for a James Williamson on Candlestick Way in the Indianapolis telephone directory database.

Attachment 11 is a comparison of "A" residential listings. The San Diego and Indianapolis telephone directory databases, respectively.

Attachment 12 is a comparison of the rarity of occurrence of different street designations in the Indianapolis telephone directory database. This information can be useful in either eliminating or finding database records, especially those having an uncommon designation, such as circle, trail or lane.

Attachment 13 is a listing of data relating to database records of the Indianapolis telephone directory in relation to "C" streets. The relative frequencies of occurrence can be exploited by a knowledgable directory assistance agent to find certain database records.

Attachment 14 shows some example virtual search parameters according to the present disclosure.

Attachment 15 is a listing of frequency of occurrence of primary names beginning with "A" or "B" in the Indianapolis residential telephone directory database by the number of characters appearing in that search field.

Attachment 16 is a table of search parameter effectiveness that helps illustrate how different search strategies can more efficiently arrive at a requested database record from within a database containing many records.

Attachment 17 is a comparison of a typical forward fill strategy searching for "Alexander" in the Indianapolis telephone directory verses an Alpha Omega fill strategy that much more rapidly arrives at a requested database record.

Attachment 18 shows an example search results in the Indianapolis telephone directory where the Alpha and Omega search characters are S and C. This table also shows how further searching within this potential listing pool can be accomplished by differentiating among the retrieved records to arrive at a single requested database record.

Attachment 1
MESA SEQUENCE

1. Customer originating call
2. ACD server – incoming trunk
3. AVR CMS activated
4. IQS customer queue
5. MESA ISO call supervision (orig to term)
6. AVR speaker independent and dependent system
7. IQS announcement, response, recording
8. AVR virtual confidence score
9. IQS screening agent (silent or announced)
10. MESA database actions
    - A<O formatted database
    - A<O street index
    - Personal phoneme database
    - A<O search algorithms
    - Search parameters
    - Virtual search parameters
    - Agent operand commands
    - Dynamic potential listing pool
    - Most effective search sequence/algorithm
    - Agent workstation status
    - Agent recommended action steps
11. IQS call routing ARU
12. IQS store and forward – call completion agent

Attachment 2

Indianapolis Res 'A"

A<O    A ------g    Total 341 Listings for 14 Primary Names

| 'ing' <O Trigram | | 'ong' <O Trigram | | All Other | |
|---|---|---|---|---|---|
| Alberding | 2 | Adjong | 1 | Agag | 2 |
| Alerding | 19 | Aleong | 2 | Alang | 1 |
| Alsing | 1 | Amlong | 1 | Alig | 13 |
| Ameling | 1 | Armstrong | 294 | Amlung | 1 |
| Appling | 1 | | 297 | Arkenberg | 1 |
| | 24 | | | | 19 |

Total A – G = 340

Conclusions:

1)     A ---- g = 86.4% probability Armstrong
2)     A ---- g = 95.9% probability Armstrong, Alerding or Alig
3)     A ---- g = PLP of 340
        Delete common A ---- g creates PLP of 14 (Delete Armstrong)
4)     ISO communicates to customer and/or agent for A<O for secondary or address or street type 1)     Armstrong, Orville    =    PLP of 1
2)     Aleong, D    =    PLP of 1
3)     Alig, R, Mill Point    =    PLP of 1
4)     Arkenberg, Washington St.    =    PLP of 1

Conclusion:

1)     A<O plus Forename, Address, or Street Type creates PLP of 1, even for common A<O.
2)     A<O ISO will provide required data for 'nested' A<O SPPSC,*
3)     Phoneme is AVR friendly
4)     If inquiry is uncommon, PLP is reduced by 95%
5)     If inquiry is very uncommon PLP is reduced by 99.7% (!)

Although the present invention has been illustrated in the context of delivering directory assistance services, the invention finds potential application in a wide variety of other arenas. For instance, many corporations and organizations maintain databases that are utilized by both internal and/or external customers to retrieve database records. Thus, a customer according to the present invention could be an internal corporate customer that contacts a database manager, who then performs a search according to the present invention. In addition, other aspects of the disclosure could find potential application in non-service delivery systems. For instance, Alpha Omega Search Algorithm strategy could be successfully implemented in cell phones to help facilitate retrieval of friend or relatives phone number from a personal database stored on the cell phone, or, the Alpha Omega Search strategy could be employed in digital video recorder systems to help a customer find a certain program in a television programming database so that the same can be recorded. Thus, the present invention is not limited to directory assistance or any provision of services that require a data retrieval from an electronic database. Many other applications of the present invention will occur to those with ordinary skill in the art based upon the above description, the attached drawings and the claims below.

ATTACHMENT 3

Indianapolis Street Names - Alpha<Omega

(Percent Frequency)

|   | % A | % O |   |   | % A | % O |
|---|------|------|---|---|------|------|
| A | 3.1  | 5.3  |   | O | 2.0  | 2.7  |
| B | 8.8  | -    |   | P | 5.3  | 1.3  |
| C | 9.65 | .7   |   | Q | .4   | -    |
| D | 3.5  | 8.3  |   | R | 5.4  | 9.0  |
| E | 3.2  | 15.0 |   | S | 9.6  | 7.3  |
| F | 2.9  | .3   |   | T | 3.8  | 6.3  |
| G | 4.0  | 2.7  |   | U | .2   | .3   |
| H | 3.9  | 2.0  |   | V | 1.3  | -    |
| I | 1.1  | .3   |   | W | 6.7  | 2.0  |
| J | .9   | -    |   | X | -    | .7   |
| K | 2.9  | 2.7  |   | Y | .3   | 10.3 |
| L | 4.9  | 5.6  |   | Z | -    | .3   |
| M | 7.4  | 1.0  |   | Numerical |  | 6.4 |

ATTACHMENT 4

REVERSE LAST OMEGA FREQUENCY (Given Name - Residence)

|   | % |   | % |
|---|---|---|---|
| A | 1.82 | N | 19.14 |
| B | - | O | 2.37 |
| C | .36 | P | 1.64 |
| D | 2.73 | Q | - |
| E | 10.02 | R | 13.84 |
| F | .73 | S | 12.93 |
| G | 1.64 | T | 5.46 |
| H | 3.46 | U | .18 |
| I | 1.46 | V | - |
| J | - | W | .91 |
| K | 4.19 | X | .55 |
| L | 6.19 | Y | 7.83 |
| M | .73 | Z | 1.82 |

Conclusion - 1) <Omega search for common alpha reduces average potential listings by 89.2%.

2) Reverse last alpha search for uncommon alpha reduces average potential listings by 98.7%.

ATTACHMENT 5

ALPHA<OMEGA FREQUENCY RELATIONSHIP
(Residential 'A' Listings - Primary Name)

|  | San Diego<br>Tot Res Listings = 521,525<br>21539 Total Res 'A' = 4.13% |  |  | Indianapolis = 452,600<br>14212  3.14% | Listings |
|---|---|---|---|---|---|
| 1. | A - a | 11.2% | a | 2.6% | 370 |
|  | b | .5 | b | .1 | 14 |
|  | c | .3 | c | - | - |
|  | d | 3.6 | d | 4.0 | 568* |
|  | e | 6.9 | e | 5.6 | 796* |
|  | f | .4 | f | .5 | 71 |
|  | g | 1.4 | g | 1.8 | 256 |
|  | h | 1.3 | h | 1.9 | 270 |
|  | i | 4.0 | i | 2.3 | 327 |
|  | j | - | j | - | - |
|  | k | .4 | k | 1.0 | 142 |
|  | l | 2.9 | l | 2.8 | 398 |
|  | m | .9 | m | 1.3 | 185 |
|  | n | 29.6 | n | 32.0 | 4547 |
|  | o | 9.3 | o | 2.3 | 327 |
|  | p | .2 | p | .4 | 57 |
|  | q | .2 | q | .2 | 28 |
|  | r | 10.7 | r | 9.0 | 1279* |
|  | s | 7.2 | s | 21.9 | 3112* |
|  | t | 3.5 | t | 4.4 | 625 |
|  | u | .7 | u | .4 | 57 |
|  | v | .3 | v | .1 | 14 |
|  | w | .2 | w | .4 | 57* |
|  | x | .2 | x | .1 | 14 |
|  | y | 3.0 | y | 4.2 | 597* |
|  | z | 4.1 | z | .7 | 99 |

| VCOM | A-N | 26.6/ | 62.9% = V Com | A-N 32.0 / |  |
|---|---|---|---|---|---|
|  | A-A | 11.2/ |  | A-S 21.9 / |  |
|  | A-R | 10.7/ | % Common | A-R  9.0 / | 27.8% V Uncom! |

| Very Uncommon = | A-b | .1/14 | A-v | .1/57 |
|---|---|---|---|---|
|  | A-f | .5/71 | A-w | .4/57 |
|  | A-p | .4/57 | A-x | .1/14 |
|  | A-q | .2/28 | A-z | .7/99 |
|  | A-u | .4/57 | A-J | - |
|  |  |  | A-C | - |

ATTACHMENT 6
Residential Search Algorithm Comparison
AOSA Example - Don Hornback, Fathom Crest

| | Primary | Secondary/Sur | Address | |
|---|---|---|---|---|
| | Total Indianapolis Residence listings | | | 452,000 |
| 1) | 'H' | | | 36,400 |
| | or | | | 769 |
| | | Don | | 89 |
| 2) | HOR - K | | | 42 |
| 2) | 'H' | | | 35,400 |
| | or | | | 769 |
| | K | Don | | 4 |
| 3) | HOR - K | Don | Fathom Crest | 1 |
| 4) | H----K | Don | | 82 |
| 5) | H----K | Don | F | 2* |
| | H----K | Don | F-M | 1 |

1) Hornback, Don    8928 Fathom Crest Indianapolis
    2) Huck, Donna    10890 Florida Rd. Fortville

* The Huck (Fortville) might not be retrieved, if not, H K, D, F would retrieve Don's listing

ATTACHMENT 7
EXAMPLE

1) Common trigram for common name
   Williams, J, Pine St.

2) Common trigram for uncommon name
   Willoughby, J, Priscilla St.

| KS | | (1) | KS | | (2) |
|---|---|---|---|---|---|
| 1 | W | 30,000 | 1 | W | 30,000 |
| 2 | I | | 2 | Y | 1,981 |
| 3 | L | 6,700 | 3 | J | 257 |
| 4 | J | 879 | 4 | P | 12** |
| 5 | Pine | 41* | 5 | A | (1)*** |

\*    Manual search by call completion agent

\*\*    No common (Wilson, Williams or Williamson) in small PLP formed by W----Y
High probability ARU would automatically
Contain without any agent Assistance.

\*\*\*    Note - Customer very likely to furnish A<O data prompting by IQS.

ATTACHMENT 8

DA WORKSHEET - EXAMPLE

Indianapolis Residence 'W'
<O Most Efficient Search Sequence (<OMESS)

DA Request

Williamson, James, Candlewick Way

| | | | |
|---|---|---|---|
| 1) | TRIGRAMM | | PLP |
| | Primary | W | 30,000 |
| | | WTL | 6,700 |
| | Forename | J | 637 |
| | Address | C | 61 |
| 2) | A < O | | PLP |
| | W | | 30,000 |
| | WIL - N | | 3,779 |
| | J | | 360 |
| | C | | 34 |
| | K | | <2 |
| | 'Way' | | 1 |
| 3) | A<O with Mess | | PLP |
| | 'Way" * | | 1290 |
| | 'C' | | 122 |
| | 'K' | | 5 |
| | 'W' | | 1 |

*One agent operand command plus 3 keystrokes

ATTACHMENT 9

DA WORKSHEET - EXAMPLE

Indianapolis Residence 'W'
Primary <u>WIL</u> ---<u>N</u> (Common)
Secondary <u>A</u> to <u>Z</u> forenames Forenames <u>Common</u>

A-B-C-D-E-G-J-K-L-M-P-R-S-T

AVG PLP = 241

'J' most common PLP = 518

<u>Uncommon</u>

F-H-I-N-O-Q-U-V-W-X-Y-Z

AVG PLP = 33.4

Uncommon 'I' = 11

Data
   'WIL' listings = 6,700
   204 trigrams
   Most Common - Williams, Wilson, Williamson Example <u>WIL</u>---<u>A</u>   Only 4 names
                             All on different street
                             2 uncommon street types - LN & CT <u>ISO Example</u>
   1)   WIL --- A, any character   PLP of 1 or   NF   ARU
   2)   WIL --- A, street type PLP of 1            ARU
   3)   WIL --- A, PLP of 4                           ARU

ATTACHMENT 10

DA WORKSHEET - EXAMPLE
Indianapolis Residence 'W'

1. Primary WIL trigram vs. A<O

Total WIL listings  =  6700

Total names  =  204

Most common names  Williams (2600)
    Wilson (1800)
    Williamson (200)

Most common <O trigram 'SON' (2258)

Common WIL --- N  =  PLP 3779

Uncommon WIL --- A  =  PLP  4*

* Any SPPCS creates PLP of 1 or zero (NF)

2a. Secondary or forename search

Common    WIL --- N, J  =  PLP 360

Uncommon    WIL --- N, (F-H-I-N-O-Q-U-V-W-X-Y-Z)  =  PLP <1

2b. Address    WIL --- N, J, A to Z address  =  PLP of 9 to 18

3. <Omega search Address Street Type

Common    WIL --- N, J. C-K  =  PLP <1

4. <Omega search Address Street Type

Common    WIL --- N, J (Court-Circle-Point-Way, etc.)  =  PLP<1

Example - Residence 'W'

```
    30,000                  3779            34              1
      |                      |               |              |
    WIL----------------------N,  J          C-----------K   Circle
      |                      |               |              |
     6700                   360              2              Operand
    ```

ATTACHMENT 11
MOST FREQUENT TRIGRAM
Residence 'A' Listings

| San Diego | | | | Indianapolis | | | |
|---|---|---|---|---|---|---|---|
| By Name | | By Trigram | | By Name | | By Trigram | |
| Anderson | 1200 | And | 1800 | | 1370 | And | 1900 |
| Allen | 690 | All | 1000 | | 1400 | All | 1766 |
| Adams | 550 | Ada | 800 | | 870 | Ada | 1000 |
| Alvarez | 460 | Alv | 580 | | 60 | Alv | 180 |
| Alexander | 250 | Ale | 450 | | 481 | Ale | 560 |

(Only 35 other Primary names)

Alibegovic
Afsharkharegh
Alcock
Aguilar
Andonov
Alvarez  400 out of 580

Arumugaswami
Abdemrazzaq
Aldenderfer
Amick
Alltop 907 pages x 115 x 5 = 521,525         452,600
'A'  37.5 x 575 = 21562 / 4.13%        14212 / 3.14%

Analysis

A-Z = 883                              A-Z = 99
Alvarez = 52.1%                        Alvarez = 60.6% prob SD 'Z' eliminates 95.9%                Indpls 'Z' eliminates 99.3% of listings
Sd<O for St eliminates 96%             <O for St eliminates 96%
Uncommon street type eliminates 99%    Uncommon street type <99%

Conclusion

SD <O a, e, n, r, s                    Indpls <O n, s, r, e, t, y
Requires 2 'VSP'                       Needs + 2 'VSP'

ATTACHMENT 12

Street Designation Study

Common    (5% or more Frequency)

- Drive
- Street
- Numeric
- Road
- Court
- Avenue

Uncommon    (1% or less Frequency)

- Point
- Circle
- Blvd
- Crossing
- Knoll
- Trail
- Walk
- Cove
- Way
- Place
- Ridge
- Building
- Run
- Terrace
- Bluff
- Lane Conclusion 1) PSR street designation a powerful search parameter to identify or exclude listings. Approximately 90 to 99% of potential listings may be excluded by this one parameters.

Example:    'Delete all common street designations'
                'Include Run only' or 'Search Run only'

2) Less than 50 street designations used in Indianapolis Residence Directory. (!)

ATTACHMENT 13
Indianapolis 'C' Street Directory
('C' Streets = 9.5 %)

1. Total Res 'C' Listings = 33,200 or 7.33% of Res
   Total Bus 'C' Listings = 13,400    9.97 of Bus
   Total 'C' Listings = 46,600

Total Indianapolis Res = 452,600  Bus = 134,430  Total Indianapolis = 587,030

2. Total street names 'C' = 866 Primary Name
   Total street names with multiple key words = 184 or 21.2%
   Total 'C' common street names A<O =
   Common <$\underline{O}$> = E, N, Y, L, R, D = 68.3  AVG = 11.4%
   Uncommon <$\underline{O}$> = All other Alpha  AVG = 1.6%
   Total 'C' streets for primary name plus street type = 1,111
   Total percent 'C' streets of total Indianapolis = 9.5%

3. Streets Per Col m = 98.3
   Total Indianapolis streets = 11,698 (Cols 119 x 98.3)

4. Average Res listings per 'C' street = 407
   Average Total listings per 'C' street = 528

5. Most common street type for 'C' streets

| Common | | | Uncommon | | | Very Uncommon | |
|---|---|---|---|---|---|---|---|
| Drive | 330 | 29.7 | Ave | 48 | 4.3 | Run   1 to 3 | 1 to 3% |
| Court | 243 | 21.9 | Way | 48 | 4.3 | Landing | " |
| Lane | 120 | 10.8   70.5 | Point | 26 | 2.3 | Mall | " |
| Circle | 90 | 8.1 | Blvd | 17 | 1.5 | Row | " |
| Road | 68 | 6.1 | Place | 13 | 1.2 | Walk | " |
| Street | 66 | 5.9 | Cove | 6 | .5 | Square | " |
|  |  |  | Pkwy | 6 | .5 | Trail | " |
|  | 836 | 75.2% |  |  |  | Terrace | " |
|  |  |  |  | 164 | 14.8% | Bypass | " |
|  |  |  |  |  |  | Crossing | " |
|  |  |  |  |  |  | Crescent | " |
|  |  |  |  |  |  | Trace | " |
|  |  |  |  |  |  | Ridge | " |
|  |  |  |  |  |  | 111 | 10.0% |

7. Only 27 'C' street types
   - 6 common streets = 75.2% (DR, CT, LN, CIR, RD, ST)
   - 21 uncommon streets = 24.8%

- 16 very uncommon streets = 11%

8. Listings per street type vary by type of street
    - Road, Street, Avenue, Boulevard and numeric streets have higher than average number of listings
    - Circle, Way, Point, Cove, Run, Row, Walk, Trail, Terrace, Trace, etc. have much fewer listings

ATTACHMENT 14

Virtual Search Parameters (VSP)

A subjective or objective characteristic that distinguishes a database record from similar records. The individual record subjective or objective characteristic may be fixed and predetermined based on database ASOF variables and/or dynamically classified and assigned based on the relative characteristic of smaller subsets of records (PLP's) identified by a search algorithm.

The following is a partial list of novel search parameter features that serve to distinguish individual records from a group of ambiguous records -

Length (number of search parameter characters)

Length (short, average, long)

Language origin (Greek, Hispanic, Arabic, etc.)

Language (English, non-English)

Search parameter words (single, multiple, etc.)

Frequency (very common, common, uncommon, very uncommon, etc.)

Confidence Scores (negative, unsure, probable, positive)

Location (city, suburban, rural, etc.)

Geographic (N-E-S-W, etc.)

Spelling/sound complexity (difficult or multiple phonemes)

Business type (Yellow Page classification, professional titles, etc.)

Purpose or use (fax, emergency, toll free, main, sales, etc.)

Any combination of a 3 parameter 5 character search plus only 1 VSP will normally create a PLP without ambiguity for most U.S. locality directories.

ATTACHMENT 15

INDIANAPOLIS RESIDENCE
A<O Primary Name 'A' & 'B'
(Length)

| Number Characters | 'A' | 'B' |
|---|---|---|
| 3 | .7% | .7% |
| 4  short | 4.4 | 9.9 |
| 5 | 25.4 | 24.9 |
| < 6 } Avg | 23.4 | 24.2 |
| > 7 } | 13.9 | 22.1 |
| 8 | 19.0 | 9.2 |
| 9 | 10.2 | 4.9 |
| 10  long | 1.5 | 1.9 |
| 11 | 1.5 | 1.9 |
| 12 |  | .3 |
|  | 100.0 | 100.0 |

| Operand Command |  |  |
|---|---|---|
| Delete +/- 6 | -53.9 PLP | -59.7 PLP |
| Search 4 only | -95.6 | -90.1 |
| Search Long only | -97.0 | -95.9 |
| Search Short only | -94.9 | -85.3 |
| Search Avg only | -62.7 | -53.7 |
| Delete +/- Avg | -67.8 | -81.8 |

Conclusion:

ASVP based on character length effectively eliminates 50 to 97% of listings from the initial PLP. This VSP will reduce utilization of AVR system resources and increase the accuracy and effectiveness of the AVR - database retrieval system.

ATTACHMENT 16
Search Parameter Effectiveness

| | | | | % Reduction | |
|---|---|---|---|---|---|
| 1) | Total | 180,000,000 | | | |
| | | -162,000,000 | 18,000,000 | 90 | Bus - Gov - Res |
| | | 16,200,000 | 1,800,000 | 90 | State |
| | | 1,620,000 | 180,000 | 90 | City |
| | | 162,000 | 18,000 | 90 | A Primary |
| | | 16,000 | 2,000 | 90 | ABC Primary |
| Trigram | | | | | |
| | | 1,800 | 200 | 90 | A Secondary |
| | | 180 | 20 | 90 | Street |
| | | | | @ 90% 7 steps = 20 | |
| 2) | Total | 180,000,000 | | | |
| | | -171,000,000 | 9,000,000 | 95 | |
| | | 8,550,000 | 450,000 | 95 | |
| | | 427,500 | 22,500 | 95 | |
| | | 21,375 | 1,125 | 95 | |
| | | 1,069 | 56 | 95 | |
| | | 53 | 3 | 95 | |
| | | | | @ 95% 6 steps = 3 | |

| | | | % Reduction | |
|---|---|---|---|---|
| 3) | Total Listings 180,000,000 | | | |
| | Total U.S. Business | 27,000,000 | 89 | First Bus - Govt - Res |
| | Total State (IND) | 742,000 | 97.5 | State |
| | Total City (Indianapolis) | 132,000 | 80 | City |
| | Total 'I' | 6,500 | 84 | 'I' Section |
| | Total 'N' | 5,210 | 81 | Trigram |
| | Total 'IND', IND ≤ S | 4,206 | 98.7 | Trigram + 1 |
| | Street Meridian | 2 | 95 | Street Alpha |

Conclusion

An additional search parameter is more effective the sooner it is utilized. For example, the initial search parameter, Business, is 90% effective by eliminating 160M Residence listings and limiting the search to only the Business listings. If this initial search parameter included the Type of Business such as Legal, Finance, etc., the initial effectiveness would be 99+%.

This more detailed search parameter for Indianapolis would produce a Step 5 search listing pool of only 5 listings vs. 3,000 with existing search techniques and algorithms. This enables PSR agent assisted IVR to select from 5 listings vs. 3,000. A manual selection is also more productive (lower AWT) with a listing pool that is 99.8% smaller.

Conclusion:

1) ALOSA identifies the 1 correct listing witch search of primary and address field plus normal surname single keyed letter.

2) ALOSA for primary field and normal single key for both surname and address reduces to only 2 listings.

3) The geographic designation (Fortville) will eliminate the second listing for Huck. ALOSA with single character for surname and address is very effective. Four keystrokes and/or agent operand command more effective than today's trigram, plus surname character. Listing pool with trigram contains 89 potential listings versus 1 or at most 2 with AOS!

Bottom Line - Use of AO (last alpha) in combination with normal trigram search algorithm reduced listing pool from 89 to 4. This is equivalent of another 95% search parameter. It is also an early use of an effective search parameter. This should increase voice recognition effectiveness. AVR system match attempts vs. 4 listings instead of 89. The listings with AOSA also tend to be different. (Hornback vs. Huck) trigram search algorithms produce similar spelling and sounding names (Indiana, Indianapolis, Wilson, Williams, etc.)

ATTACHMENT 17

ALPHA<OMEGA FILL vs. FORWARD FILL (Indianapolis Residence 'A' - Alexander)

Forward Fill

| Step | ALEXANDER | Potential Vocabulary Pool | PWP Names Per Step | Eliminated Cum | PWP Step % Accuracy | % Error |
|---|---|---|---|---|---|---|
| 1) | A---------- | 1800 | 0 | 0 | 0 | 100.0 |
| x | | | | | | |
| 2) | Al-------- | 438 | -1362 | -1362 | .2 | 99.8 |
| x | | | | | | |
| 3) | Ale------- | 30 | -408 | -1770 | 3.3 | 96.7 |
| x | | | | | | |
| 4) | Alex------ | 14 | -16 | -1786 | 7,1 | 92,9 |
| x | | | | | | |
| 5) | Alexa----- | 5 | -9 | -1975 | 20 | 80 |
| x | | | | | | |
| 6) | Alexan--- | 4 | -1 | -1996 | 25 | 75 |
| x | | | | | | |
| 7) | Alexand-- | 2 | 0 | -1796 | 25 | 75 |
| x | | | | | | |
| 8) | Alexande- | 2 | -2 | -1798 | 50 | 50 |
| x | | | | | | |
| 9) | Alexander | 1 | -1 | -1799 | 100 | 0 |

A<O FILL

| Step | ALEXANDER | Pool | Per Step | Cum | % Accuracy | % Error |
|---|---|---|---|---|---|---|
| 1) | A-------- | 1800 | 0 | 0 | 0 | 100 |
| 2) | A-------r | 122 | -1678 | -1678 | .8 | 99.2 |
| 3) | Al------r | 23 | -99 | -1777 | 4.3 | 95.7 |
| 4) | Ale-----r | 1 | -22 | -1799 | 100.0 | 0 |

ATTACHMENT 18

FIGURE _____ A<O '<u>S</u>---<u>C</u>' PLP

| | | | | | | |
|---|---|---|---|---|---|---|
| 1) | SAYOC | | | | | |
| 2) | SCHMALSTIC | | JOHN | S<u>A</u>RGEN<u>T</u> | | ROAD |
| 3) | <u>S</u>IMA<u>C</u> | | <u>I</u>VAN | <u>A</u>DMIRAL<u>S</u> | | 'WAY' |
| 4) | SINKOVIC | | | | | |
| PLP | 46800 | 168 | 23  3 | 2  1 | | |
| Sequence | (1) | (2) | (3) | (4) | | |
| A MESS | 46800 | | | 4 | 1 | 94 |
| Sequence | (1) | | | (3) | (4) | (2) |

The invention claimed is:

1. A method of searching and retrieving from a database, comprising the steps of:
    establishing a communication link between a requestor and a service provider, and the communication link originating from the requestor;
    receiving requested database record information from the requestor, requestor inputting a search query that includes non-sequential first and last elements of a plurality of different terms in a single search field of a requested database record, wherein first and last elements are each a single alphanumeric character, and the search query omits a plurality of elements of the search field positioned between the first and last elements; and executing the search query;
    selecting at least one database record that matches the search query and supplying the requestor with information from the selected database record.

2. The method of claim 1 including a step of eliminating a portion of the selected database records at least in part by identifying an aspect of a database record that is absent from the requested database record.

3. The method of claim 1 wherein the search field is a first search field; and the search query includes first and last non-sequential elements of a second search field.

4. The method of claim 1 wherein the search query includes at least one additional element that is other than non-sequential first and last elements of a term of a search field.

5. The method of claim 1 wherein at least one of the first and last elements is one of a format and a phoneme.

6. The method of claim 1 wherein the inputting step includes a step of vocalizing at least a portion of the search query to a voice recognition system.

7. The method of claim 6 wherein the vocalizing step includes one of a format and a phoneme.

8. The method of claim 7 wherein the vocalizing step includes discrete utterances of the first and last elements.

9. The method of claim 6 including a step of extracting the first and last elements from a whole term uttered in the vocalizing step.

10. The method of claim 1 wherein the search field includes an audiogram field.

11. The method of claim 1 wherein the search query includes an element positioned between the first and last elements.

12. The method of claim 1 wherein the at least one database record is a plurality of database records; and sorting the selected database records according to a predetermined criteria different from an order of the database records in the database.

13. The method of claim 12 wherein the sorting step includes a step of ordering the selected database records according to a frequency of occurrence of the first and last elements in the database.

14. The method of claim 1 wherein the search query includes an attribute of a minority of the database records in the database relative to a majority of the database, and the attribute not being a portion of the database records.

15. A method of providing a database record retrieval service, comprising the steps of:
    establishing a communication link between a requestor and a service provider, and the communication link originating from the requestor;
    receiving requested database record information from the requestor;
    formulating a search query based on the requested database record information that includes non-sequential first and last elements of a plurality of different terms in a single search field, wherein first and last elements are each a single alphanumeric character, and the search query omits a plurality of elements of the search field positioned between the first and last elements; executing the search query:
    selecting at least one database record that matches the search query; and
    supplying the requestor with information from the selected database record.

16. The method of claim 15 wherein the formulating step includes the steps of: screening information supplied by the requestor with a live screening agent; and formulating the search query based upon at least one of, information from a speaker independent voice recognition system and information from the live screening agent.

17. The method of claim 16 wherein the information from the speaker independent voice recognition originates from a requestor utterance; and the information from the live screening agent includes an utterance processed by a speaker dependent voice recognition system associated with utterances specific to the live screening agent.

18. The method of claim 17 including a step of determining a confidence score based upon a determined accuracy of a result from the speaker independent voice recognition system; the search query includes a portion from the live screening agent if the confidence score is below a first predetermined threshold, but includes only information from the speaker independent voice recognition system if the confidence score is above a second predetermined threshold.

19. The method of claim 15 wherein the selecting step includes selecting a subset of the database that includes a plurality of database records that match the search query, which is a first search query; identifying an aspect of each of the database records of the subset that is unique to the respective database records; formulating a second search query at least in part by requesting additional information regarding the aspect from the requestor; executing the second search query on the subset; and retrieving, from the subset, at least one database record that matches the second search query.

20. The method of claim 19 wherein the additional information is derived from an utterance from the requestor to the speaker independent voice recognition system; and
    the requesting step includes a step of selecting one of a plurality of predetermined questions to the requestor based upon the identified aspect.

21. The method of claim 20 wherein the first search query includes portions of a name search field associated with the requested database record; and the supplying step includes a step of providing a telephone number to the requestor.

22. The method of claim 21 wherein the second search query includes a portion of an address search field.

* * * * *